United States Patent
Konno et al.

(10) Patent No.: US 9,309,399 B2
(45) Date of Patent: Apr. 12, 2016

(54) PIGMENT DISPERSION LIQUID, A METHOD FOR PRODUCING THE PIGMENT DISPERSION LIQUID, A PHOTOSENSITIVE COLOR RESIN COMPOSITION COMPRISING THE PIGMENT DISPERSION LIQUID, AN INK-JET INK COMPRISING THE PIGMENT DISPERSION LIQUID, A TONER FOR ELECTROPHOTOGRAPHIC PRINTING COMPRISING THE PIGMENT DISPERSION LIQUID, AND COLOR FILTER

(75) Inventors: Masayo Konno, Kanagawa (JP); Yukie Kawazu, Kanagawa (JP); Yumi Saiki, Kanagawa (JP); Shoichi Komatsu, Kanagawa (JP); Syuichi Mitsuhashi, Kanagawa (JP); Shunsuke Shinozaki, Kanagawa (JP)

(73) Assignee: DNP FINE CHEMICALS CO., LTD., Yokohama-shi, Kanagawa (JP)

( * ) Notice: Subject to any disclaimer, the term of this patent is extended or adjusted under 35 U.S.C. 154(b) by 11 days.

(21) Appl. No.: 13/878,324

(22) PCT Filed: Oct. 19, 2010

(86) PCT No.: PCT/JP2010/068372
§ 371 (c)(1),
(2), (4) Date: Apr. 8, 2013

(87) PCT Pub. No.: WO2012/046353
PCT Pub. Date: Apr. 12, 2012

(65) Prior Publication Data
US 2013/0216945 A1    Aug. 22, 2013

(30) Foreign Application Priority Data

Mar. 31, 2009 (JP) ................. 2009-084779
Oct. 8, 2010 (JP) ................. 2010-228218

(51) Int. Cl.
| C08L 33/24 | (2006.01) |
| C08L 33/14 | (2006.01) |
| C08K 5/53 | (2006.01) |
| C08K 5/5333 | (2006.01) |
| C08K 5/5313 | (2006.01) |

(52) U.S. Cl.
CPC . *C08L 33/14* (2013.01); *C08K 5/53* (2013.01); *C08K 5/5313* (2013.01); *C08K 5/5333* (2013.01)

(58) Field of Classification Search
CPC ......... C08L 33/14; C08L 33/24; C08L 33/26; C08K 5/02; C08K 5/09; C08K 5/36; C08K 5/53; C08K 5/5313; C08K 5/5317; C08K 5/5333; C08F 20/52; C08F 20/54; C08F 20/20; C08F 22/36; C08F 22/38
See application file for complete search history.

(56) References Cited

U.S. PATENT DOCUMENTS

| 5,713,993 | A |   | 2/1998 | Grezzo Page et al. |
| 6,521,715 | B1 | * | 2/2003 | Ma .............................. 525/379 |
| 2001/0047740 | A1 |   | 12/2001 | Wada et al. |

FOREIGN PATENT DOCUMENTS

| JP | 05-230405 A | 9/1993 |
| JP | 05-331780 A | 12/1993 |
| JP | 06-289214 A | 10/1994 |
| JP | 08-292316 A | 11/1996 |
| JP | 10-088044 A | 4/1998 |
| JP | 10-338832 A | 12/1998 |
| JP | 11-501353 A | 2/1999 |
| JP | 2001-288385 A | 10/2001 |
| JP | 2003-201434 A | 7/2003 |
| JP | 2006-338043 A | 12/2006 |
| JP | 2004-182787 A | 7/2007 |
| JP | 2008-248109 A | 10/2008 |
| JP | 2009-025813 A | 2/2009 |
| JP | 2010-235748 A | 10/2010 |
| WO | 97/15633 A1 | 5/1997 |
| WO | WO 9715633 A1 * | 5/1997 ............. C09D 11/00 |
| WO | 2008/156148 A1 | 12/2008 |
| WO | WO 2008156148 A1 * | 12/2008 |

OTHER PUBLICATIONS

English language machine translation of WO 2008-156148 (Dec. 2008).*
International Search Report; mailed Jan. 25, 2011; PCT/JP2010/068372.

* cited by examiner

*Primary Examiner* — Karuna P Reddy
(74) *Attorney, Agent, or Firm* — Ladas & Parry LLP

(57) ABSTRACT

The present invention is to provide a pigment dispersion liquid which has excellent pigment dispersion stability and high productivity even in the case of using a fine pigment and having high pigment concentration; a method for producing the pigment dispersion liquid; a color resin composition which has excellent pigment dispersion stability, causes no clogging problem, has excellent adhesion, and is able to form color layers with high pigment concentration, with accuracy; and a color filter comprising the resin composition. Disclosed is a method for producing a pigment dispersion liquid, comprising the step of dispersing a pigment by mixing at least a pigment (A), a polymer (B) having tertiary or lower amines, an amine-reactive low molecular compound (C), and a dispersion medium (D), and dispersing the pigment (A) while reacting the polymer (B) with the low molecular compound (C), and a pigment dispersion liquid produced by the production method.

4 Claims, 1 Drawing Sheet

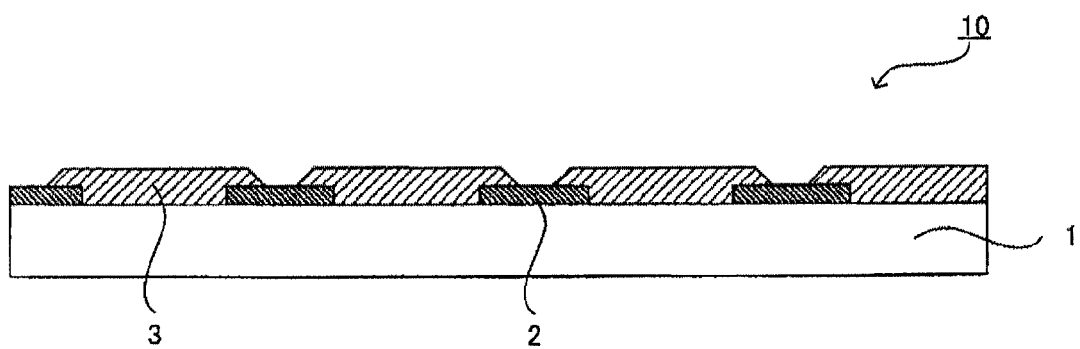

PIGMENT DISPERSION LIQUID, A METHOD FOR PRODUCING THE PIGMENT DISPERSION LIQUID, A PHOTOSENSITIVE COLOR RESIN COMPOSITION COMPRISING THE PIGMENT DISPERSION LIQUID, AN INK-JET INK COMPRISING THE PIGMENT DISPERSION LIQUID, A TONER FOR ELECTROPHOTOGRAPHIC PRINTING COMPRISING THE PIGMENT DISPERSION LIQUID, AND COLOR FILTER

TECHNICAL FIELD

The present invention relates to a pigment dispersion liquid with excellent pigment dispersion stability, a method for producing the pigment dispersion liquid, a photosensitive color resin composition comprising the pigment dispersion liquid, an ink-jet ink comprising the pigment dispersion liquid, a toner for electrophotographic printing comprising the pigment dispersion liquid, and a color filter comprising the photosensitive color resin composition.

BACKGROUND ART

In image sensors of filming equipment such as CCD and displays such as LCD and PDP, a color filter is used to record and reproduce color images. In general, the color filter comprises a transparent substrate, color layers formed on the transparent substrate and made of a color pattern of three primary colors, red, green and blue, and a light-shielding part formed on the transparent substrate so as to divide the color patterns.

Methods such as the pigment dispersing method, the dyeing method, the electrodeposition method and the printing method, are known as the method for forming such color layers. Among these methods, the pigment dispersing method having excellent properties on average, is thus widely used.

In the pigment dispersing method, for example, a photosensitive resin composition for color layers, which comprises a pigment, is provided on a transparent substrate, exposed in a desired pattern and then developed to form color layers in pattern. In the case of forming color layers in this manner, sometimes, the photosensitive resin composition partly remains undissolved and left after development (hereinafter may be referred to as "scumming.") When the photosensitive color composition remains undissolved and left on non-pixel regions of the substrate, it results in a decrease in transparency or contrast, display defects, etc. Moreover, when the photosensitive resin composition remains on the edge of patterns, there are problems that can affect subsequent processes, such as detachment of ITO layer and deterioration in sealing properties during a liquid crystal cell production process.

In recent years, to improve the color reproducibility of a color filter, color layers are required to have higher transparency and higher concentration. To form color layers with high concentration, it is needed to increase the concentration of the pigment in the resin composition for color layers to be used. However, increasing the pigment concentration involves a problem of difficulty in obtaining pigment dispersion stability. Also, the following problems are caused by increasing the pigment concentration: as a result of a relative decrease in the content of the components which contribute to color layer-forming properties such as photosensitivity and solubility, the layer forming ability that the resin composition inherently has, gets insufficient and the photosensitive resin composition unexposed is likely to remain after development (increase in scumming); and the adhesion between the substrate and a patterned cured layer of the photosensitive resin composition gets poor during development.

To solve the scumming problem in which the unexposed photosensitive resin composition remains, a method has been proposed in Patent Literature 1, in which an organic carboxylic anhydride having a molecular weight of 800 or less, is contained in a color resin composition.

However, even by the method as disclosed in Patent Literature 1, it is impossible to obtain excellent dispersion ability in the case of high pigment concentration and to fully prevent the occurrence of scumming. It is also difficult to obtain a cured product with sufficiently-high adhesion after exposure.

Also in recent years, there is an increasing demand for a display with higher definition, higher luminance and higher contrast, and the use of finer pigments has been studied to meet the demand. However, finer pigments are unstable and pose a problem with dispersion stability. To solve this problem, the use of pigment dispersing agents with high polarity (for example, Patent Literature 2) has been proposed. In this case, however, due to high polarity, applicable solvents and thus the range of applicable members are limited. Commercially-available pigment dispersing agents are also problematic in that the required amount tends to be large, so that problems with development property and adhesion of the layer thus produced are likely to occur and due to the trade-off relationship between pigment dispersion stability and film forming properties, there is a difficulty in increasing the performance of the resin composition.

As the method for uniform pigment dispersion, a method for producing an aqueous solution of a pigment-containing polymer by mixing a polymerization initiator with a monomer-containing aqueous solution for polymerization was proposed (Patent Literature 3). However, when considering the case of applying this method to organic solvent, due to wettability difference between organic solvent and pigment-dispersed water, there is such a problem such that the pigment is likely to settle out. There is another problem such that removal of a pigment-containing polymer from an aqueous solution results in high cost of production.

A method for achieving pigment dispersion stability by adding a specific solvent as a dispersion aid, has been also proposed (Patent Literature 4). However, there is a limit on the dispersion stabilizing effects provided by the use of dispersion aid.

In addition, the pigment dispersion liquid is used in ink-jet inks, toners for electrophotographic printing, writing implements, cosmetics and so on. Even in these fields, dispersion stability of fine pigments is required.

CITATION LIST

Patent Literature 1: Japanese Patent Application Laid-Open (JP-A) No. H08-292316
Patent Literature 2: JP-A No. 2004-182787
Patent Literature 3: JP-A No. H06-289214
Patent Literature 4: JP-A No. 2008-248109

SUMMARY OF INVENTION

Technical Problem

In light of the above circumstances, an object of the present invention is to provide the following: a pigment dispersion liquid which has excellent pigment dispersion stability and high productivity even in the case of using a fine pigment and having high pigment concentration; a method for producing the pigment dispersion liquid; a photosensitive color resin composition which has excellent pigment dispersion stability and excellent adhesion and which is able to form color layers with high pigment concentration, with accuracy; an ink-jet ink; a toner for electrophotographic printing; and a color filter comprising the photosensitive color resin composition and/or the ink-jet ink.

Solution to Problem

As the result of diligent researches, the inventors of the present invention have found that higher dispersion performance, which is absolutely different from that of the case of using a previously-synthesized dispersing agent, can be obtained by the in-situ dispersion method in which a pigment is dispersed in a dispersion medium while reacting a polymer (B) having tertiary or lower amines with a amine-reactive low molecular compound (C); therefore, it is possible to suppress dispersion liquid viscosity even in the case of using a fine pigment and having high pigment concentration and thus to obtain excellent pigment dispersion stability. The inventors completed the present invention based on this knowledge.

That is, the method for producing a pigment dispersion liquid according to the present invention comprises the step of dispersing a pigment by mixing at least a pigment (A), a polymer (B) having tertiary or lower amines, an amine-reactive low molecular compound (C), and a dispersion medium (D), and dispersing the pigment (A) while reacting the polymer (B) with the low molecular compound (C).

The pigment dispersion liquid according to the present invention is produced by the above pigment dispersion liquid production method of the present invention.

According to the present invention, by mixing the pigment (A), the polymer (B) having tertiary or lower amines, and the amine-reactive low molecular compound (C) and dispersing the pigment (A) while reacting the polymer (B) with the low molecular compound (C), it is possible to provide a pigment dispersion liquid with excellent pigment dispersion stability even in the case of using a pigment comprising particles that have been made into finer particles or in the case of having high pigment concentration. Also according to the present invention, it becomes easy to disperse a pigment with poor dispersibility; therefore, it is possible to widen the range of types of selectable pigments and, for example, it is also possible to select a pigment with the desired coloring ability or a low-cost pigment, while ensuring pigment dispersibility and dispersion stability.

Also according to the present invention, it is possible to obtain excellent pigment dispersion stability even when the concentration of the pigment dispersing agent is lower than those of traditional ones; therefore, it is possible to produce a color composition with excellent properties such as excellent developing ability, resistance to scumming, excellent adhesion, excellent luminance and high voltage holding rate. It is also possible to obtain a color composition which is less likely to cause pigment aggregation in dispersion liquid or color composition over time, which has low viscosity and cause little change in viscosity, and change in particle size over time is small.

In the present invention, it is especially preferable that the ratio of the total number of amine-reactive functional groups in the low molecular compound (C) to the total number of amines in the polymer (B), is 10 to 70%, because it is possible to further decrease the viscosity of the pigment dispersion liquid and to increase the dispersion stability of the liquid.

The polymer (B) having tertiary or lower amines is preferably a block copolymer, from the viewpoint of excellent pigment dispersion stability.

In the pigment dispersion liquid and pigment dispersion liquid production method according to the present invention, it is preferable that the low molecular compound (C) is one or more kinds selected from the group consisting of the following general formulae (1) to (3), because it is possible to obtain excellent pigment dispersion stability even in the case of using a fine pigment and having a high pigment concentration and further to have excellent development property.

[Chemical formula 1]

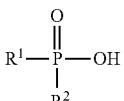

General formula (1)

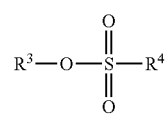

General Formula (2)

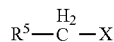

General Formula (3)

wherein $R^1$ to $R^5$ are each independently a hydrogen atom, a straight-chain, branched-chain or cyclic alkyl group having 1 to 20 carbon atoms, a vinyl group, a phenyl or benzyl group which may have a substituent, or —O—$R^6$ in which $R^6$ is a straight-chain, branched-chain or cyclic alkyl group having 1 to 20 carbon atoms, a vinyl group, a phenyl or benzyl group which may have a substituent, or a (meth)acryloyl group bound via an alkylene group having 1 to 4 carbon atoms; and X is a chlorine atom, a bromine atom or an iodine atom.

In the pigment dispersion liquid and pigment dispersion liquid production method according to the present invention, it is preferable that the polymer (B) has an amine value of 10 to 200 mg KOH/g, because it is possible to obtain excellent pigment dispersion stability even in the case of using a fine pigment and having high pigment concentration.

In the pigment dispersion liquid and pigment dispersion liquid production method according to the present invention, it is preferable that the low molecular compound (C) has a molecular weight of 50 to 400, because it is possible to obtain excellent pigment dispersion stability even in the case of using a fine pigment and having high pigment concentration.

The photosensitive color resin composition of the present invention comprises the pigment dispersion liquid, a polyfunctional monomer (E) and a photopolymerization initiator (F). By the use of the pigment dispersion liquid of the present invention, the photosensitive color resin composition according to the present invention is provided with excellent pigment dispersion stability, causes no clogging problem, has excellent adhesion, and is able to form color layers with high pigment concentration, with accuracy. The photosensitive color resin composition is suitably used in the production of the color filter of the present invention, which will be described below.

An ink-jet ink according to the present invention comprises the pigment dispersion liquid. Due to the use of the pigment dispersion liquid, the ink-jet ink of the present invention is less likely to aggregate; therefore, it offers stable ejection, resistance to deflection of ejecting direction, excellent storage stability and resistance to clogging. The ink-jet ink of the present invention is suitably used in the production of the color filter of the present invention, which will be described below.

A color filter according to the present invention comprises color layers formed with the photosensitive color resin composition of the present invention or the ink-jet ink of the present invention.

Because the color filter of the present invention comprises the color layers formed with the photosensitive color resin composition comprising the pigment dispersion liquid of the present invention or with the ink-jet ink comprising the liquid, the color filter can be a color layer with high adhesion to the substrate. Therefore, it is possible to obtain a color filter which is resistant to problems such as a decrease in transparency or contrast, display defects, detachment of ITO layer and deterioration in sealing properties during a liquid crystal cell production process. Also, the photosensitive color resin composition shows high pigment dispersion stability even in the case of having a high pigment concentration and using a fine pigment. Therefore, because of comprising the color layers formed with the photosensitive color resin composition, the color filter can be a color filter provided with high color reproducibility, high definition, high luminance and high contrast.

A toner for electrophotographic printing according to the present invention comprises the pigment dispersion liquid. Because the toner for electrophotographic printing according to the present invention comprises the pigment dispersion liquid, it provides increased coloring ability and is allowed to have high concentration. Therefore, it is possible to obtain images with high definition.

Advantageous Effects of Invention

The present invention provides: a pigment dispersion liquid which has excellent pigment dispersion stability and high productivity even in the case of using a fine pigment and having high pigment concentration; a method for producing the pigment dispersion liquid; a photosensitive color resin composition which has excellent pigment dispersion stability, causes no clogging problem, has excellent adhesion, and is able to form color layers with high pigment concentration, with accuracy; an ink-jet ink which offers stable ejection and has excellent storage stability; a toner for electrophotographic printing, which has high coloring ability and offers images with high definition; and a color filter with high color reproducibility, high definition, high luminance and high contrast.

BRIEF DESCRIPTION OF DRAWINGS

FIG. 1 is a sectional view schematically showing an example of the color filter of the present invention.

DESCRIPTION OF EMBODIMENTS

Hereinafter, the pigment dispersion liquid according to the present invention, the method for producing the pigment dispersion liquid, the photosensitive color resin composition, the ink-jet ink, the color filter and the toner for electrophotographic printing, will be described in order. In the present invention, "pigment dispersion liquid" is a mixture which comprises a pigment, a dispersion medium and other components added as needed and which is obtained by dispersing the pigment. A color resin composition with high pigment dispersibility can be prepared by mixing a pigment dispersion liquid with a binder resin, a photosensitive component, other curable components and additives such as a leveling agent and a coupling agent, as needed.

In the present invention, "(meth)acrylic resin" means acrylic resin and/or methacrylic resin; (meth)acrylate means acrylate and/or methacrylate; and (meth)acryloyl group means acryloyl group and/or methacryloyl group.

Also in the present invention, "polymer (B) having tertiary or lower amines" may be simply referred to as "polymer (B)", and "amine-reactive low molecular compound (C)" may be simply referred to as "low molecular compound (C)".

I. Pigment Dispersion Liquid and the Method for Producing the Same

The pigment dispersion liquid production method of the present invention comprises the step of dispersing a pigment by mixing at least the pigment (A), the polymer (B) having tertiary or lower amines, the amine-reactive low molecular compound (C), and the dispersion medium (D), and dispersing the pigment (A) while reacting the polymer (B) with the low molecular compound (C).

Also, the pigment dispersion liquid of the present invention is a pigment dispersion liquid produced by the production method and is obtained by the production method comprising the step of dispersing a pigment by mixing at least the pigment (A), the polymer (B) having tertiary or lower amines, the amine-reactive low molecular compound (C), and the dispersion medium (D), and dispersing the pigment (A) while reacting the polymer (B) with the low molecular compound (C)

According to the present invention, dispersion performance which is absolutely different from that of the case of dispersing a pigment by using a previously-synthesized dispersing agent, can be obtained by the in-situ dispersion method in which the pigment (A) is dispersed while reacting the polymer (B) with the low molecular compound (C) in the dispersion medium (D); therefore, it is possible to obtain a pigment dispersion liquid which can suppress dispersion liquid viscosity even in the case of using a fine pigment and having high pigment concentration, which has excellent pigment dispersion stability, and which has high productivity. It is also possible to obtain a pigment dispersion liquid with excellent dispersion stability even in the case of using a pigment that is less likely to disperse, or to relatively decrease the amount the dispersing agent used.

Moreover, by setting the ratio of the total number of amine-reactive functional groups in the low molecular compound (C) to the total number of amines in the polymer (B), to 10 to 70%, it is possible to produce a pigment dispersion liquid with more excellent dispersion stability.

In the present invention, "dispersing the pigment (A) while reacting the polymer (B) with the low molecular compound (C)" means that the reaction of the polymer (B) with the low molecular compound (C) is initiated before, after or simultaneously with the start of the step of dispersing the pigment (A) and the pigment dispersing step is completed simultaneously with or after the substantial completion of the reaction.

The previously-synthesized dispersing agent encompasses conventional, commercially-available pigment dispersing agents and one obtained by previously reacting the polymer (B) with the low molecular compound (C) in the absence of the pigment (A) and treated as a pigment dispersing agent after the completion of the reaction. As shown by Comparative Examples mentioned below, the effects of the present invention cannot be obtained even after the polymer (B) and the pigment (A) are dispersed and then the low molecular compound (C) is added thereto.

The reason why the above-mentioned effects can be obtained by dispersing the pigment (A) while reacting the polymer (B) with the low molecular compound (C) in the dispersion medium (D), is estimated as follows.

A polymer dispersing agent is known as a pigment dispersing agent, which is obtained by reacting a polymer having amines with an amine-reactive compound to cationize part of the amines.

However, the pigment dispersing agent of this type has high polarity and is apt to cause self-aggregation. Meanwhile, the amount of pigment dispersing agent required for pigment dispersion, is proportional to the surface area of the pigment. As the fine dispersion of the pigment proceeds, the surface area of the pigment increases. In general, the amount of the pigment dispersing agent is adjusted so that the pigment dispersion liquid thus produced can be stabilized even when the pigment particles are made into finer particles. At the time of initiating dispersion, therefore, the surface area of the pigment is small and the pigment dispersing agent is in an excess state, so that the pigment dispersing agent is likely to cause self-aggregation. It is thus needed to increase the amount of the pigment dispersing agent. In this case, some of the dispersing agent, which is not absolutely adsorbed to the pigment, remains, aggregates and inhibits the compatibility of the whole dispersion system.

According to the present invention, however, the polymer (B) and the low molecular compound (C) are reacted in the vicinity of the pigment by providing dispersion and reaction sites at the same time and dispersing the pigment. Therefore, the pigment dispersing agent produced in situ can be quickly and efficiently adsorbed to the pigment (A), resulting in an ideal dispersion system in which self-aggregation of the pigment dispersing agent is less likely to occur and the pigment is less likely to reaggregate.

In addition, excellent pigment dispersibility is obtained in the vicinity of the pigment by a small amount of pigment dispersing agent comprising the polymer (B) and the low molecular compound (C), so that there is almost no pigment dispersing agent which is not adsorbed to the pigment and necessary.

As a result, pigment dispersibility which has no negative effects on the compatibility between the resin part and dispersion medium (solvent) in the dispersion system and is stable, is obtained.

Also according to the present invention, the step of previously synthesizing the polymer (B) with the low molecular compound (C) is not necessary. Therefore, high productivity is obtained and there is such an effect that it is possible to deal in many ways by appropriately selecting the type and amount of the low molecular compound (C), depending on the type of the pigment to be dispersed, the target degree of dispersion, or the target properties of the color composition comprising the dispersion liquid, even in the case where, for example, the polymer (B) prepared is just one kind.

Especially when the ratio of the total number of amine-reactive functional groups in the low molecular compound (C) to the total number of amines in the polymer (B), is 10 to 70%, there is almost no low molecular compound (C) unreacted and also there is almost no free reactant between the amines in the polymer (B) with the amine-reactive low molecular compound (C). Therefore, the ratio is preferably 10 to 70%.

The pigment dispersion liquid of the present invention comprises at least the pigment (A), a reactant between the polymer (B) having tertiary or lower amines with the amine-reactive low molecular compound (C) which is reactive with the amines in the polymer, and the dispersion medium (D). However, the pigment dispersion liquid may further comprise other components, as needed. Hereinafter, the components used will be described.

<Pigment (A)>

As the pigment used in the present invention, conventionally-known pigments can be used. The pigment can be a simple pigment (a coloring compound per se) or may comprise additives such as a pigment derivative, to improve the properties of the pigment. A pigment derivative is a compound which has a role in providing an acidic group such as sulfone group or carboxyl group, a basic group such as amino group or alkylamide group, a functional group such as phthalimide-methyl group, nitro group or sulfonamide group, to the structure of the simple pigment and thus providing various functions to a pigment, such as stabilization of pigment crystals, inhibition of crystal growth, and improvement in pigment dispersion stability. Pigment derivatives include salts in which a counter ion is attached to the above-mentioned acidic or basic group. In the combination of the pigment and the pigment derivative, they can be common or different in pigment structure. In many cases, commercially-available products produced through a surface treatment step and containing a pigment derivative, are sold as pigment. The pigment derivative can be added upon dispersion as a dispersion aid for improving dispersibility. Preferable derivative pigments include sulfonic acid mono-substituted products or sulfonamide mono-substituted products of pigments such as Pigment Red 254, Pigment Red 255, Pigment Red 264, Pigment Red 177, Pigment Yellow 138 and Pigment Blue 15:6.

Concrete examples of organic pigments that are preferably used in the present invention, are shown in the following Tables 1 and 2.

TABLE 1

| Pigment | | | | | | |
|---|---|---|---|---|---|---|
| | Color Index No. | | | | | |
| C.I. Pigment Yellow | 1 | 3 | 12 | 13 | 14 | 15 |
| | 16 | 17 | 20 | 24 | 31 | 55 |
| | 60 | 61 | 65 | 71 | 73 | 74 |
| | 81 | 83 | 93 | 95 | 97 | 98 |
| | 100 | 101 | 104 | 106 | 108 | 109 |
| | 110 | 113 | 114 | 116 | 117 | 119 |
| | 120 | 126 | 127 | 128 | 129 | 138 |
| | 139 | 150 | 151 | 152 | 153 | 154 |
| | 155 | 156 | 166 | 168 | 175 | 180 |
| | 185 | 213 | 214 | | | |
| C.I. Pigment Orange | 1 | 5 | 13 | 14 | 16 | 17 |
| | 24 | 34 | 36 | 38 | 40 | 43 |
| | 46 | 49 | 51 | 61 | 63 | 64 |
| | 71 | 73 | | | | |

TABLE 2

| Pigment | | | | | | |
|---|---|---|---|---|---|---|
| | Color Index No. | | | | | |
| C.I. Pigment Red | 1 | 2 | 3 | 4 | 5 | 6 |
| | 7 | 8 | 9 | 10 | 11 | 12 |
| | 14 | 15 | 16 | 17 | 18 | 19 |
| | 21 | 22 | 23 | 30 | 31 | 32 |
| | 37 | 38 | 40 | 41 | 42 | 48:1 |
| | 48:2 | 48:3 | 48:4 | 49:1 | 49:2 | 50:1 |
| | 52:1 | 53:1 | 57 | 57:1 | 57:2 | 58:2 |
| | 58:4 | 60:1 | 63:1 | 63:2 | 64:1 | 81:1 |
| | 83 | 88 | 90:1 | 97 | 101 | 102 |
| | 104 | 105 | 106 | 108 | 112 | 113 |
| | 114 | 122 | 123 | 144 | 146 | 149 |
| | 150 | 151 | 166 | 168 | 170 | 171 |
| | 172 | 174 | 175 | 176 | 177 | 178 |
| | 179 | 180 | 185 | 187 | 188 | 190 |
| | 193 | 194 | 202 | 206 | 207 | 208 |

TABLE 2-continued

| Pigment | | | | | | |
|---|---|---|---|---|---|---|
| | Color Index No. | | | | | |
| | 209 | 215 | 216 | 220 | 222 | 224 |
| | 226 | 238 | 242 | 243 | 245 | 254 |
| | 255 | 264 | 265 | | | |
| C.I. Pigment Violet | 1 | 19 | 23 | 29 | 32 | 36 |
| | 38 | | | | | |
| C.I. Pigment Green | 7 | 36 | 58 | | | |
| C.I. Pigment Blue | 1 | 15 | 15:3 | 15:4 | 15:6 | 60 |
| | 80 | | | | | |

Examples of inorganic pigments that are preferably used in the present invention, include titanium oxide, zinc oxide, lead sulfate, yellow lead, zinc yellow, red iron oxide, cadmium red, ultramarine blue, prussian blue, chromium oxide green, cobalt green, amber, titanium black, synthetic iron black and carbon black.

These pigments can be used alone or in combination of two or more kinds.

As the pigment used in the toner for electrophotographic printing according to the present invention, various kinds of pigments used in the field of toners can be used, such as carbon black and titanium white. It is also possible to add a dye. Examples of black colorants include carbon black and magnetic particles comprising cobalt, nickel, iron oxide black, ferromanganese oxide, zinc iron oxide and nickel iron oxide. Yellow, magenta, cyan colorants and so on can be used as pigments for color toners. Concrete examples of pigments for color toners which are preferably used in the present invention, are shown in the following Tables 3 to 5.

TABLE 3

| Yellow Colorant Pigment | | | | | | |
|---|---|---|---|---|---|---|
| | Color Index No. | | | | | |
| C.I. Pigment Yellow | 3 | 12 | 13 | 14 | 15 | 17 |
| | 62 | 65 | 73 | 74 | 83 | 90 |
| | 93 | 95 | 96 | 97 | 109 | 110 |
| | 111 | 120 | 128 | 129 | 138 | 147 |
| | 155 | 168 | 180 | 181 | | |

TABLE 4

| Magenta Colorant Pigment | | | | | | |
|---|---|---|---|---|---|---|
| | Color Index No. | | | | | |
| C.I. Pigment Red | 2 | 3 | 5 | 6 | 7 | 23 |
| | 48 | 48:2 | 48:3 | 48:4 | 57 | 57:1 |
| | 58 | 60 | 63 | 64 | 68 | 81 |
| | 81:1 | 83 | 87 | 88 | 89 | 90 |
| | 112 | 114 | 122 | 123 | 144 | 146 |
| | 149 | 163 | 166 | 169 | 170 | 177 |
| | 184 | 185 | 187 | 202 | 206 | 207 |
| | 209 | 220 | 251 | 254 | | |
| C.I. Pigment Violet | 19 | | | | | |

TABLE 5

| Cyan Colorant Pigment | | | | | | |
|---|---|---|---|---|---|---|
| | Color Index No. | | | | | |
| C.I. Pigment Blue | 1 | 2 | 3 | 5 | 7 | 15 |
| | 15:1 | 15:2 | 15:3 | 15:4 | 16 | 17 |
| | 60 | 62 | 66 | | | |

In the present invention, the average dispersed particle diameter of the pigment used is not particularly limited as long as it is possible to color the color layer of the color filter the desire color in the formation of the color layers using the ink-jet ink, the toner for electrophotographic printing, or the color resin composition, all of which will be produced below. For example, in the case of the color resin composition used in the color layers of the color filter, generally, the average dispersed particle diameter is preferably in the range of 0.01 to 0.30 μm, particularly preferably in the range of 0.01 to 0.10 μm. This is because the color layers formed with the color resin composition comprising the pigment dispersing agent of the present invention, can be color layers with excellent luminance and contrast. The average dispersed particle diameter of the pigment can be measured by a light scattering particle size distribution analyzer.

The content of the pigment used in the pigment dispersion liquid of the present invention, is not particularly limited as long as it is possible to provide the desired color, depending on the intended use. The pigment content differs depending on the used pigment type and is not particularly limited. In the solid content of the pigment dispersion liquid, the pigment content is preferably in the range of 50 to 90% by weight, particularly preferably in the range of 60 to 80% by weight. This is because it is possible that the dispersion liquid lacks viscosity stability or the dispersed particle diameter is in the inappropriate range, whenever the pigment content is more or less than the range. In the present invention, the solid content contains all components except the dispersion medium, and the liquid compound is contained therein. When the pigment derivative is contained as well as the pigment, the total of the pigment and pigment derivative is preferably in the above range.

<Polymer (B) having Tertiary or Lower Amines>

The polymer (B) having tertiary or lower amines (hereinafter may be simply referred to as "polymer (B)") means a polymer in which a repeating unit(s), which is at least one kind of amine selected from the group consisting of at least a tertiary amine, a secondary amine and a primary amine, is contained as at least a part of the structure thereof.

The reason why there is an increase in dispersion stability by the use of the polymer (B), is estimated as follows.

As shown in the following chemical formula (1) example, the amino groups in the polymer (B) react with the low molecular compound (C) for cationization. When multiple amino groups in the molecular are cationized, due to the electrical interaction between the polar group(s) in the pigment and the cationized amino groups, pigment dispersing agent produced in situ, which is a reactant between the polymer (B) and the low molecular compound (C), is likely to adsorb to the pigment surface, so that it is considered that there is an increase in pigment dispersion stability. As a result, there is an increase in dispersion stability, resulting in excellent dispersibility. The total number of amines means the sum of the number of amine groups in the polymer (B) and that of the functional groups derived from the amino groups.

The interaction with the polar group(s) in the pigment is increased by setting the ratio of the total number of amine-reactive functional groups in the low molecular compound (C) to the total number of amines in the polymer (B), to preferably 10 to 70%, more preferably 20 to 50%.

[Chemical formula 2]

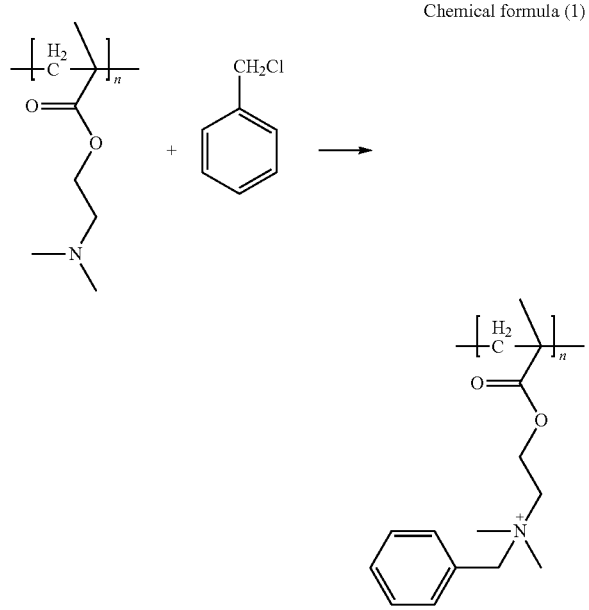

Chemical formula (1)

Examples of the main chain structure of the polymer (B) having tertiary or lower amines include (meth)acrylic resin, polyurethane resin, polyester resin, polyamide resin, polyether resin, epoxy resin and polyimide resin. Particularly preferred is (meth)acrylic resin.

The polymer (B) having tertiary or lower amines is a polymer in which at least one kind of amine selected from the group consisting of a tertiary amine, a secondary amine and a primary amine, is contained as a repeating unit(s). Particularly preferred is a polymer in which a tertiary amine is contained as a repeating unit. This is because the polymer (B) having tertiary or lower amines is less reactive with other resins (e.g., alkali-soluble acrylic resin and epoxy resin), is less likely to induce gelation, and provides excellent dispersibility when the pigment (A) is dispersed while reacting the polymer (B) with the low molecular compound (C). In the polymer, the position of the amines is not limited to any of main chain, side chain and polymer end. The structure of the polymer is not particularly limited. However, the polymer (B) is preferably a block copolymer, from the viewpoint of dispersion stability.

More preferably, the polymer (B) is an AB block copolymer having A block, which has no amine as a repeating unit, and B block, which has amine as a repeating unit, or an ABA block copolymer. Most preferably, the polymer (B) is an AB block copolymer.

Hereinafter, the A and B blocks in the case where the polymer (B) is a block copolymer, will be described.

The A block having no amine as a repeating unit is a site which shows solvent affinity when used as the pigment dispersing agent. The A block is a solvophilic part. It is not particularly limited and can be preferably used as a constituent unit, as long as it has no nitrogen atom-containing functional group such as an amino group and is a monomer which is copolymerizable with the following monomers having an ethylenically-unsaturated double bond. Preferred is a block copolymer copolymerized with a styrene monomer such as styrene, α-methylstyrene; vinyl acetate; a (meth)acrylic acid ester monomer such as methyl(meth)acrylate, ethyl(meth)acrylate, propyl(meth)acrylate, butyl(meth)acrylate, benzyl (meth)acrylate, cyclohexyl(meth)acrylate, isobornyl(meth)acrylate, hydroxyethyl(meth)acrylate, dicyclopentanyl (meth)acrylate, dicyclopentenyl(meth)acrylate, dicyclopentanylethyl(meth)acrylate, dicyclopentenylethyl (meth)acrylate, caprolactoneethyl(meth)acrylate, valerolactoneethyl(meth)acrylate, 2-ethylhexyl(meth)acrylate, phenoxyethyl(meth)acrylate, 1-adamantyl(meth)acrylate, glycidyl(meth)acrylate, polyethylene glycol(meth)acrylate, polypropylene glycol(meth)acrylate, polyalkylene glycol (meth)acrylate.

Due to their excellent dispersibility, methyl(meth)acrylate, benzyl(meth)acrylate, 2-ethylhexyl(meth)acrylate and polyethylene glycol(meth)acrylate are more preferably used as a repeating unit.

The B block having an amine as a repeating unit, is a site with adsorption property to pigment.

Examples of the main chain structure of the B block include (meth)acrylic resin, polyurethane polyurethane resin, polyester resin, polyamide resin, polyether resin, epoxy resin and polyimide resin. Particularly preferred is (meth)acrylic resin.

The structure of the amine part of the B block is not particularly limited. Suitable examples include —NHR and —NR'R" in which R and R'R" are each an alkyl group which may have a substituent, an allyl group, an aryl group, an aralkyl group, a cycloalkyl group or the like. More suitable examples include —NR'R" in which R'R" is an alkyl group, an aryl group or an aralkyl group. Still more suitable examples include —NR'R" in which R'R" is an alkyl group, more specifically, a methyl group, an ethyl group or the like (R' and R" may be the same or different from each other). A suitable repeating unit including them is represented by the following formula, for example:

[Chemical formula 3]

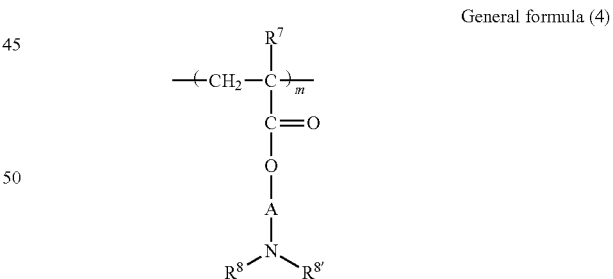

General formula (4)

wherein $R^7$ is a hydrogen atom or a methyl group; $R^8$ and $R^{8'}$ are each independently a hydrogen atom or an alkyl group having 1 to 8 carbon atoms; A is an alkylene group having 1 to 8 carbon atoms, or a divalent group represented by —[CH $(R^9)$—CH$(R^{10})$—O]x-CH$(R^9)$—CH$(R^{10})$— or —[(CH$_2$)y-O]z-(CH$_2$)y-; $R^9$ and $R^{10}$ are each independently a hydrogen atom or a methyl group; m is an integer of 1 to 200; x and z are each an integer of 1 to 18; and y is an integer of 1 to 5.

As the repeating unit containing an amine, dimethylaminoethyl(meth)acrylate is preferably used.

In order to ensure dispersion stability, it is most preferred that the repeating unit containing an amine is not contained in the B block. However, the repeating unit containing an amine can be contained to the extent that the desired dispersion stability can be obtained. In the B block, the ratio of the repeating units containing an amine is preferably 0% by weight to 40% by weight, more preferably 0% by weight to 20% by weight, most preferably 0% by weight.

The content of tertiary or lower amines in the polymer (B) is preferably in the range which allows the amine value of the polymer (B) to be 10 to 200 mg KOH/g, more preferably in the range which allows the polymer (B) to have an amine value of 10 to 190 mg KOH/g, still more preferably in the range which allows the polymer (B) to have an amine value of 0 to 170 mg KOH/g. When the amine value of the polymer (B) is out of the range, there is a possible decrease in the storage stability of the dispersion liquid. The amine value can be obtained in accordance with JIS-K7237.

The polymer (B) preferably has a weight average molecular weight of 3,000 to 70,000, more preferably 4,000 to 60,000, still more preferably 5,000 to 50,000, most preferably 5,000 to 20,000. When the weight average molecular weight of the polymer (B) is less than 3,000, there is a possible decrease in stability of pigment dispersibility. On the other hand, when the weight average molecular weight of the polymer (B) is more than 70,000, there is a possibility of scumming, decrease in development property, and decrease in compatibility with dispersion medium. The weight average molecular weight can be obtained by gel permeation chromatography (GPC) as a standard polystyrene equivalent molecular weight.

The polymer (B) is preferably produced by living polymerization. Living polymerization may be carried out by any of conventionally-known methods and can be produced by any of anionic living polymerization, cationic living polymerization and radical living polymerization.

The polymer (B) having tertiary or lower amines can be appropriately selected from commercially-available pigment dispersing agents for use. Preferred is a pigment dispersing agent in which all the amine part is not cationized. However, one in which the amine part is partly cationized, can be also used.

In the case of using the polymer in which the amine(s) is (are) partly cationized, it is preferred that the amount of the amine-reactive low molecular compound (C) used, which will be described below, is adjusted so that when the reaction between the polymer and the low molecular compound (C) is completed, the ratio of the total number of the amino groups in the polymer and functional groups derived from the amino groups, to the total number of the amino groups cationized, is 10% to 70%.

Commercially-available, pigment dispersing agent products include, for example, BASF EFKA-4300 and BASF EFKA-4330 (manufactured by BASF Japan Ltd.), Disperbyk 161, Disperbyk 162, Disperbyk 182, Disperbyk 2001, BYK-LPN6919, BYK-LPN21116 (manufactured by BYK-Chemie Japan KK), SOLSPERSE 32000 and SOLSPERSE 33000 (manufactured by The Lubrizol Corporation) and AJISPER PB821, AJISPER PB822 and AJISPER PB827 (manufactured by Ajinomoto Fine-Techno. Co., Inc.)

The amount of the polymer (B) used is not particularly limited as long as the pigment can be uniformly dispersed. From the viewpoint of pigment dispersion stability, it is preferably 5 to 90 parts by weight, more preferably 10 to 70 parts by weight, relative to the pigment of 100 parts by weight. When the amount of the polymer (B) used is less than the range, it is difficult to uniformly disperse the pigment. When the amount is more than the range, it is possible that the resulting photosensitive color resin composition has poor development property or scumming occurs. According to the present invention, it is possible to decrease the amount of the polymer (B) used, which correspond to the pigment dispersing agent, so that it can be suitably used even the amount is as small as 20 to 50 parts by weight relative to the pigment of 100 parts by weight.

A typical example of the reactant of the polymer (B) is a reactant between the polymer (B) and the low molecular compound (C).

<Amine-reactive Low Molecular Compound (C) Reactive with the Amines in the Polymer>

The amine-reactive low molecular compound (C) which is reactive with the amines in the polymer, is a low molecular compound which has functional group(s) that is (are) reactive with the amines in the polymer (B), which is combined with the compound for use. Examples of the low molecular compound reactive with amines include carbonic acid, phosphoric acid, phosphoric acid, phosphinic acid, sulfuric acid, alkyl halide, aryl halide, allyl halide, dialkyl sulfate, methyl alkylsulfonate, methyl arylsulfonate, carbonate ester and phosphoric ester.

It is particularly preferable that the amine-reactive low molecular compound (C) which is reactive with the amines in the polymer, is one or more kinds selected from the group consisting of the following general formulae (1) to (3). To use a compound selected from the group comprising such compounds is advantageous in that excellent dispersion stability and excellent development property are obtained.

[Chemical formula 4]

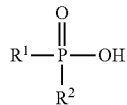

General formula (1)

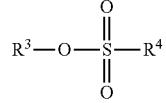

General Formula (2)

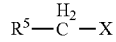

General Formula (3)

wherein $R^1$ to $R^5$ are each independently a hydrogen atom, a straight-chain, branched-chain or cyclic alkyl group having 1 to 20 carbon atoms, a vinyl group, a phenyl or benzyl group which may have a substituent, or —O—$R^6$ in which $R^6$ is a straight-chain, branched-chain or cyclic alkyl group having 1 to 20 carbon atoms, a vinyl group, a phenyl or benzyl group which may have a substituent, or a (meth)acryloyl group bound via an alkylene group having 1 to 4 carbon atoms; and X is a chlorine atom, a bromine atom or an iodine atom.

The straight-chain, branched-chain or cyclic alkyl group having 1 to 20 carbon atoms as $R^1$ to $R^6$ may be straight- or branched-chain and also may contain a cyclic structure. Concrete examples thereof include a methyl group, an ethyl group, an n-propyl group, an i-propyl group, an n-butyl group, an isobutyl group, an sec-butyl group, a tert-butyl group, an n-pentyl group, an n-hexyl group, an n-heptyl group, an n-octyl group, an n-nonyl group, an n-decyl group, an n-undecyl group, a dodecyl group, a cyclopentyl group, a cyclohexyl group, a tetradecyl group and an octadecyl group. Preferred is a straight-chain, branched-chain or cyclic alkyl group having 1 to 15 carbon atoms, and still more preferred is a straight-chain, branched-chain or cyclic alkyl group having 1 to 8 carbon atoms.

As a result of diligent researches, the inventors of the present invention have found that the low molecular compound (C) preferably has a molecular weight of 50 to 400, more preferably 100 to 350, still more preferably 100 to 330.

Concrete examples of the amine-reactive low molecular compound (C) which is reactive with the amines in the polymer, include methyl chloride, methyl bromide, ethyl chloride, ethyl bromide, methyl iodide, ethyl iodide, n-butyl chloride, hexyl chloride, octyl chloride, dodecyl chloride, tetradecyl chloride, hexadecyl chloride, phenethyl chloride, benzyl chloride, benzyl bromide, benzyl iodide, chlorobenzene, allyl chloride, dimethyl sulfate, diethyl sulfate, di-n-propyl sulfate, dimethyl carbonate, diethyl carbonate, methyl methanesulfonate, methyl p-toluenesulfonate, monobutyl phosphate, dibutyl phosphate, methyl phosphate, dibenzyl phosphate, diphenyl phosphate, phenylphosphinic acid, phenylphosphonic acid and dimethacryloyloxyethyl acid phosphate.

Preferred are benzyl chloride, methyl p-toluenesulfonate, dibutyl phosphate, phenylphosphinic acid, phenylphosphonic acid and dimethacryloyloxyethyl acid phosphate, since they have particularly excellent dispersion stability.

The amount of the amine-reactive low molecular compound (C) used is as follows. The ratio of the total number of amine-reactive functional groups in the low molecular compound (C) to the total number of amines in the polymer (B), is not particularly limited; however, it is preferably 10 to 70%, more preferably 20 to 50%. The ratio of the total number of amine-reactive functional groups in the low molecular compound (C) to the total number of amines in the polymer (B) means the ratio of the total number of the amine-reactive functional groups in the low molecular compound (C) to the total number of amino groups and functional groups derived from the amino groups in the polymer (B).

A typical example of the reactant of the low molecular weight is a reactant between the low molecular weight and the polymer (B).

<Dispersion Medium (D)>

In the pigment dispersion liquid of the present invention, a dispersion medium is contained for pigment dispersion.

Examples of the dispersion medium used in the present invention, include solvents and polymerizable monomers.

Solvents are preferably used as the dispersion medium in, for example, the photosensitive color composition, ink-jet ink and so on, which will be described below. Polymerizable monomers are preferably used as the dispersion medium in, for example, the toner for electrophotographic printing, photosensitive ink-jet ink and so on, which will be described below.

The solvent used in the present invention is not particularly limited as long as it is a solvent which is not reactive with and can dissolve or uniformly disperse the components used in the present invention. Concrete examples thereof include cyclohexyl acetate; methoxybutyl acetate (MBA); ethylene glycol monoalkyl ether acetates such as ethylene glycol monomethyl ether acetate; diethylene glycol monoalkyl ethers such as diethylene glycol monomethyl ether and diethylene glycol monoethyl ether; diethylene glycol monoalkyl ether acetates such as diethylene glycol mono-n-butyl ether acetate; propylene glycol monoalkyl ether acetates such as propylene glycol monomethyl ether acetate (PGMEA) and propylene glycol monoethyl ether acetate; other ethers such as diethylene glycol dimethyl ether; ketones such as cyclohexanone, 2-heptanone and 3-heptanone; alkyl lactate esters such as ethyl 2-hydroxypropionate; other esters such as 3-methyl-3-methoxybutyl propionate ethyl 3-methoxypropionate, methyl 3-ethoxypropionate, ethyl 3-ethoxypropionate, n-butyl acetate, isobutyl acetate, n-amyl formate, isoamyl acetate, n-butyl propionate, ethyl butyrate, isopropyl butyrate, n-butyl butyrate and ethyl pyruvate; and γ-butyrolactone, 3-methoxybutanol and 3-methyl-3-methoxybutyl acetate. These solvents can be used alone or in combination of two or more kinds.

The polymerizable monomer used in the present invention is not particularly limited as long as it is a polymerizable monomer which is not reactive with and can dissolve or uniformly disperse the components used in the present invention. The polymerizable monomer preferably has a viscosity of 200 mPa·s or less, more preferably 50 mPa·s or less, and still more preferably 10 mPa·s or less.

Preferred examples thereof include monovinyl monomers, (meth)acrylates and monoolefin monomers. Concrete examples thereof include styrene, α-methylstyrene, vinylimidazole, vinyl acetate, acrylonitrile, allyl glycidyl ether, N-methylmaleimide, N-cyclohexylmaleimide, N-benzylmaleimide, N-phenylmaleimide, N-methylphenylmaleimide, methyl(meth)acrylate, ethyl(meth)acrylate, propyl (meth)acrylate, isopropyl(meth)acrylate, n-butyl(meth) acrylate, isobutyl(meth)acrylate, t-butyl(meth)acrylate, 2-ethoxyethyl(meth)acrylate, 2-methoxyethyl(meth)acrylate, 2-ethylhexyl(meth)acrylate, lauryl(meth)acrylate, stearyl(meth)acrylate, 2-hydroxyethyl(meth)acrylate, 2-hydroxypropyl(meth)acrylate, glycerol(meth)acrylate, glycidyl (meth)acrylate, allyl(meth)acrylate, isobornyl(meth)acrylate, cyclohexyl(meth)acrylate, dicyclopentanyl(meth) acrylate, dicyclopentanyloxyethyl(meth)acrylate, adamantyl (meth)acrylate, benzyl(meth)acrylate, phenoxyethyl(meth) acrylate, tetrahydrofurfuryl(meth)acrylate, diethylene glycol (meth)acrylate, polyethylene glycol(meth)acrylate, polypropylene glycol(meth)acrylate, ethylene, propylene and butylene. These polymerizable monomers can be used alone or in combination of two or more kinds.

The pigment dispersion liquid of the present invention is prepared by using the dispersion medium as mentioned above generally at a ratio of 60 to 85% by weight to the total amount of the pigment dispersion liquid comprising the dispersion medium. When the dispersion medium amount is too small, there is an increase in viscosity and dispersibility is likely to decrease. When the dispersion medium amount is too large, there is a decrease in pigment concentration and a possible difficult in achieving a target chromaticity coordinate after preparing the color resin composition which will be produced below.

<Other Components>

The pigment dispersion liquid of the present invention may comprise other components as needed, to the extent not to hinder the object of the present invention. For example, the pigment dispersion liquid may comprise a polymer (binder resin) which makes, upon the preparation of the color resin composition which will be described below, the pigment dispersion liquid compatible with a photosensitive composition comprising the color resin composition. Such a polymer also functions as a pigment dispersion aid resin, depending on selection. Also, depending on polymer selection, it is possible to prepare pigment dispersing agents suitable for use in writing inks and cosmetics, as well as for use in the ink-jet ink, the toner for electrophotographic printing and the color filter, which will be described below.

In addition, the following can be added as needed, to the extent not to hinder the object of the present invention: a surfactant for improving wettability and those for improve adhesion, such as a silane coupling agent, an antifoaming agent, an anticissing agent, an antioxidant, an aggregation inhibitor and an ultraviolet absorbing agent.

[Binder Resin]

The binder resin used in the present invention is not particularly limited. When used in the production of the color filter, the binder resin is preferably a resin resistant to heat and organic solvents used in the production process. Concrete examples thereof include photosensitive and non-photosensitive resins such as epoxy resin, (meth)acrylic resin, urethane resin, polyester resin, polyimide resin and polyolefin resin.

Among them, particularly preferred resin is alkali-soluble resin having an acidic functional group such as carboxyl group. The alkali-soluble resin is preferably a copolymer of a carboxyl group-containing unsaturated monomer with a different copolymerizable ethylenically unsaturated monomer, more preferably a compound containing an epoxy group and an ethylenically unsaturated group per molecule, such as one having, for example, glycidyl(meth)acrylate attached thereto and an ethylenically unsaturated group introduced to a side chain thereof.

Preferred examples of the carboxyl group-containing unsaturated monomer include (meth)acrylic acid, maleic acid, crotonic acid, mono[2-(meth)acryloyloxyethyl]phthalate and ω-carboxypolycaprolactone mono(meth)acrylate. Particularly preferred is (meth)acrylic acid. These carboxyl group-containing unsaturated monomers can be used alone or in combination of two or more kinds.

Examples of the ethylenically unsaturated monomer include methyl(meth)acrylate, n-butyl(meth)acrylate, cyclohexyl(meth)acrylate, isobornyl(meth)acrylate, dicyclopentanyl(meth)acrylate, dicyclopentenyl(meth)acrylate, dicyclopentanylethyl(meth)acrylate, dicyclopentenylethyl(meth)acrylate, allyl(meth)acrylate, styrene, α-methylstyrene, benzyl(meth)acrylate, hydroxyethyl(meth)acrylate, 2-dimethylaminoethyl(meth)acrylate, 2-ethylhexyl(meth)acrylate, 2-hydroxyl(meth)ethyl acrylate, phenoxyethyl(meth)acrylate, 1-adamantyl(meth)acrylate, polyethylene glycol(meth)acrylate, polypropylene glycol(meth)acrylate, polyalkylene glycol(meth)acrylate and macromonomers thereof; N-substituted maleimides such as N-methylmaleimide, N-cyclohexylmaleimide, N-benzylmaleimide, N-phenylmaleimide and N-methylphenylmaleimide, and N-vinylpyrrolidone. These ethylenically unsaturated monomers can be used alone or in combination of two or more kinds.

The weight average molecular weight of the binder resin is not particularly limited. However, it is preferably 3,000 to 30,000, more preferably 5,000 to 25,000, from the viewpoint of development property and adhesion.

In general, the content of the binder resin is preferably in the range of 1 to 60 parts by weight, particularly preferably in the range of 5 to 40 parts by weight, relative to the solid content of 100 parts by weight. When the content is less than the range, the resulting photosensitive color resin composition described below, is provided with insufficient curability and it is possible that no excellent pattern can be formed. When the content is more than the range, the <Method for Producing the Pigment Dispersion Liquid>

The pigment dispersion liquid production method of the present invention comprises the step of dispersing a pigment by mixing at least the pigment (A), the polymer (B) having tertiary or lower amines, the amine-reactive low molecular compound (C), and the dispersion medium (D), and dispersing the pigment (A) while reacting the polymer (B) with the low molecular compound (C).

The reason why the above-described effects are exerted by containing the pigment dispersion liquid of the present invention obtained by dispersing the pigment (A) in the dispersion medium (D) while reacting the polymer (B) having tertiary or lower amines with the low molecular compound (C) which is reactive with the amines, is estimated as follows.

Conventional methods provide the pigment dispersing agent with poor adsorption efficiency to the pigment; therefore, it is needed to increase the amount of the pigment dispersing agent added to obtain sufficient dispersibility. The pigment dispersing agent has almost no developing performance and adhesion performance to substrates, so that an increase in the amount of the pigment dispersing agent results in scumming and a decrease in adhesion.

In contrast, according to the present invention, the amount of the pigment dispersing agent is minimal, so that negative influence is less likely to occur on developing performance and adhesion performance to substrates. Also, the amount of the cure component can be increased by decreasing the amount of the dispersing agent; therefore, it is possible to increase curability and adhesion. Moreover, due to the structure of the low molecular compound (C) to be reacted with the polymer (B), it is possible to provide optional performances to the polymer (B), such as developing performance and adhesion performance to substrates, and thus to obtain a dispersion liquid having various performances for different purposes, with maintaining excellent dispersing performance.

In addition, it is possible to produce a pigment dispersion liquid with excellent dispersion stability by setting the ratio of the total number of amine-reactive functional groups in the amine-reactive low molecular compound (C) to the total number of amines in the polymer (B) having tertiary or lower amines as the repeating unit, to preferably 10 to 70%, more preferably 20 to 50%. It is possible to use a dispersing agent containing amines partly reacted (cationized) if, upon dispersion, an amine-reactive low molecular compound is added for reaction. When the ratio of the amine part in the polymer to the sum of the previously reacted amine part and the amine part reacted upon the dispersion, is preferably 10 to 70%, more preferably 20 to 50%, a pigment dispersion liquid with excellent dispersion stability can be produced.

The pigment dispersion liquid produced by the production method of the present invention has excellent pigment dispersion stability.

Hereinafter, the method for producing the pigment dispersion liquid according to the present invention, will be described in detail.

First, the pigment (A), the polymer (B) having tertiary or lower amines, the amine-reactive low molecular compound (C), the dispersion medium (D) and, as needed, other components such as a binder resin, are prepared.

Next, the step of mixing these components will be described.

The mixing order is not particularly limited. The components can be added one by one to the dispersion medium (D) and mixed one by one with the medium. Mixing can be carried out after all of the components are added to the medium. Or, dispersion can be initiated just after adding at least the pigment (A) to the dispersion medium (D) and before adding other components, and the remaining components can be added during the dispersion. It is needed that the reaction of the polymer (B) with the low molecular compound (C) is substantially completed before or simultaneously with the reaction completion.

The order of adding the components to the dispersion medium (D) is not particularly limited and the components can be added in a desired order. Each component can be divided into portions and added.

Or, for example, dispersion media each containing a single component only, such as the dispersion medium (D) containing the polymer (B) only and one containing the low molecular compound (C) only, can be prepared and mixed together.

In the above mixing step, the low molecular component (C) can be added at once or partially. Or, it is allowed that the low molecular component (C) is not added in the above mixing step and added at once after the reaction is initiated. In these cases, in the below-described pigment dispersing step, the rest of the low molecular compound (C) can be divided into portions or added at once. It is needed that the reaction of the polymer (B) with the low molecular compound (C) is substantially completed before or simultaneously with the reaction completion. As the dispersion progresses and the pigment particles are made into finer particles, aggregation and an increase in the dispersion liquid viscosity in accordance with the aggregation, are likely to occur. Accordingly, the timing to add the rest of the low molecular compound (C) is adjusted to the extent to produce the effects of the present invention.

The timing at which the reaction of the polymer (B) with the low molecular compound (C) is initiated, varies depending on the type of the low molecular compound (C) used. There are such cases that the reaction is initiated simultaneously with the mixing and the reaction is initiated by heating.

When heating is needed to initiate the reaction, the heating method is not particularly limited. However, it is possible to initiate the reaction by the heat generated in the pigment dispersing step described below.

In the pigment dispersing step, the pigment dispersing method is not particularly limited. The pigment can be dispersed with various kinds of dispersers. Dispersers for conducting dispersion are, for example, roll mills such as a two-roll mill and a three-roll mill, ball mills such as a vibrating ball mill, paint conditioners, high-pressure dispersers, ultrasonic dispersers, and beads mills such as a continuous disk type beads mill and a continuous annular type beads mill. For beads mills, a preferred dispersion condition is that the beads diameter is preferably 0.03 to 3.00 mm, more preferably 0.05 to 2.0 mm. Before using the pigment dispersing method, predispersion can be carried out with a dissolver, etc.

The pigment dispersing step can be started before the reaction is initiated or during the period of time between the initiation and substantial completion of the reaction. The timing to start the pigment dispersing step is not particularly limited. However, it is preferable to start the step as soon as possible after the initiation of the reaction, because it is possible to prevent the pigment dispersing agent from self-aggregation.

When the amount of the pigment dispersion liquid produced at a time is large, a time lag is very likely to occur. However, even in this case, it is preferable to start the pigment dispersing step within 6 hours after the substantial initiation of the reaction, more preferably within 2 hours, particularly preferably within 30 minutes.

The pigment dispersing time is appropriately adjusted depending on the disperser used, production volume, etc., and is not particularly limited. In general, the time is about 1 to 15 hours.

For example, a preferred production procedure is as follows: the polymer (B) is added to a dispersion medium and mixed; the low molecular compound (C) and a pigment are added thereto; the mixture is subjected to predispersion with a dissolver or the like; then, the mixture is subjected to dispersion further with a beads mill. A binder resin can be preferably added at any of these stages.

The pigment dispersion liquid of the present invention is used in various applications, as well as in preliminary preparation of the photosensitive color resin composition for color filters, which will be described below. It can be also used for preliminary preparation of a color resin composition that needs no photosensitive component, and of a thermosetting color resin composition. Other applications include a photosensitive resin composition used to produce products other than color filters, an ink-jet ink, a toner for electrophotographic printing, a writing ink and cosmetics, for example.

II. Photosensitive Color Resin Composition

The photosensitive color resin composition of the present invention comprises the pigment dispersion liquid, the polyfunctional monomer (E) and the photopolymerization initiator (F). A solvent is used as the dispersion medium of the pigment dispersion liquid. According to the present invention, by the use of a resin composition comprising the pigment dispersion liquid of the present invention, the photosensitive color resin composition according to the present invention is provided with excellent pigment dispersion stability, causes no clogging problem, has excellent adhesion, and is able to form color layers with high pigment concentration, with accuracy. The photosensitive color resin composition of the present invention can be suitably used in the production of the color filter which will be described below.

Hereinafter, the case of using the photosensitive color resin composition of the present invention in the production of the color filter which will be described below, will be used.

The photosensitive resin composition for color filters comprises at least the pigment dispersion liquid of the present invention, the polyfunctional monomer (E) and the photopolymerization initiator (F). The composition may further comprise other components, as needed. Hereinafter, the components used will be described.

The components that can be contained in the pigment dispersion liquid of the present invention, may be the same as the components described above under "I. Pigment dispersion liquid and the method for producing the same." Accordingly, they will not be described below.

<Polyfunctional Monomer (E)>

The polyfunctional monomer contained in the photosensitive color resin composition for color filters of the present invention, is not particularly limited as long as it is polymerizable. In general, is has two or more ethylenically unsaturated double bonds.

As such a polyfunctional monomer, a polyfunctional (meth)acrylate having an acryloyl group or methacryloyl group is particularly preferred.

Examples of the polyfunctional (meth)acrylate include difunctional (meth)acrylates such as diethylene glycol di(meth)acrylate, diethylene glycol di(meth)acrylate, hexanediol di(meth)acrylate, long chain aliphatic di(meth)acrylate, neopentyl glycol di(meth)acrylate, hydroxypivalic acid neopentylglycol di(meth)acrylate, pentaerythritol di(meth)acrylate, stearic acid-modified pentaerythritol di(meth)acrylate, propylene di(meth)acrylate, glycerol di(meth)acrylate, triethylene glycol di(meth)acrylate, tetraethylene glycol di(meth)acrylate, tetramethylene glycol di(meth)acrylate, butylene glycol di(meth)acrylate, dicyclopentanyldi(meth)acrylate, polyethylene glycoldi(meth)acrylate, polypropylene di(meth)acrylate, triglyceroldi(meth)acrylate, neopentyl glycol-modified trimethylolpropane di(meth)acrylate, allylcyclohexyl di(meth)acrylate, methoxylated cyclohexyl di(meth)acrylate, acrylated isocyanurate, bis(acryloxyneopentyl glycol)adipate, bisphenol A di(meth)acrylate, tetrabromobisphenol A di(meth)acrylate, bisphenol S di(meth)

acrylate, butanediol di(meth)acrylate, phthalic acid di(meth)acrylate, phosphoric acid di(meth)acrylate and zinc di(meth)acrylate.

Examples of the polyfunctional (meth)acrylate also include trifunctional or higher (meth)acrylate such as trimethylolpropane tri(meth)acrylate, trimethylolethane tri(meth)acrylate, glycerol tri(meth)acrylate, pentaerythritol tri(meth)acrylate, alkyl-modified dipentaerythritol tri(meth)acrylate, phosphoric acid tri(meth)acrylate, tris(acryloxyethyl)ditrimethylolpropane, tris(methacryloxyethyl)ditrimethylolpropane, pentaerythritol tetra(meth)acrylate, dipentaerythritol tetra(meth)acrylate, ditrimethylolpropane tetra(meth)acrylate, alkyl-modified dipentaerythritol tetra(meth)acrylate, dipentaerythritol monohydroxy penta(meth)acrylate, dipentaerythritol hexa(meth)acrylate, dipentaerythritol penta(meth)acrylate, alkyl-modified dipentaerythritol penta(meth)acrylate, urethane tri(meth)acrylate, ester tri(meth)acrylate, urethane hexa(meth)acrylate, ester hexa(meth)acrylate, and succinic acid-modified dipentaerythritol penta(meth)acrylate.

These polyfunctional (meth)acrylates can be used alone or in combination of two or more kinds.

Especially in the case where excellent photocurability (high sensitivity) is required of the photosensitive color resin composition of the present invention, the polyfunctional (meth)acrylate preferably has two or more polymerizable double bonds per molecule (difunctional), more preferably three or more polymerizable double bonds per molecule (trifunctional).

The content of the polyfunctional monomer is preferably in the range of 5 to 60% by weight, more preferably 10 to 40% by weight, relative to the solid content of the photosensitive color resin composition. This is because when the content of the polyfunctional monomer is too small, it is possible that the photosensitive color resin composition is not sufficiently cured and melts off the exposed region; moreover, when the content of the compound having the polyfunctional monomer is too large, it is possible that the unexposed region is not developed.

<Photopolymerization Initiator (F)>

As the photopolymerization initiator (F) of the present invention, photopolymerization initiators generally used in color filter production can be used. They can be used alone or in combination of two or more kinds.

Concrete examples of such photopolymerization initiators include derivatives such as benzoin and benzophenone, which are compounds able to produce free radicals by ultraviolet energy, and esters thereof; thioxanthone derivatives such as xanthone, diethylthioxanthone and isopropylthioxanthone; oxime ester compounds such as Irgacure OXE-01, Irgacure OXE-02 (manufactured by BASF Japan Ltd.) and ADEKA OPT-N-1919 (manufactured by Asahi Denka Co., Ltd.); halogen-containing compounds such as chlorosulfonyl, chloromethyl polynuclear aromatic compounds, chloromethyl heterocyclic compounds and chloromethylbenzophenones; triazines; fluorenones; haloalkanes; redox couples formed between photoreducing dyes and reductants; organic sulfur compounds; and peroxides.

Moreover, concrete examples of such photopolymerization initiators include aromatic ketones such as Michler ketone, 4,4'-bisdiethylaminobenzophenone, 4-methoxy-4'-dimethylaminobenzophenone, 2-ethylanthraquinone and phenanthrene; benzoin ethers such as benzoin methyl ether, benzoin ethyl ether and benzoin phenyl ether; benzoins such as methylbenzoin and ethylbenzoin; halomethylthiazole compounds such as 2-(o-chlorophenyl)-4,5-phenylimidazole dimer, 2-(o-chlorophenyl)-4,5-di(m-methoxyphenyl)imidazole dimer, 2-(o-fluorophenyl)-4,5-diphenylimidazole dimer, 2-(o-methoxyphenyl)-4,5-diphenylimidazole dimer, 2,4,5-triarylimidazole dimer, 2-(o-chlorophenyl)-4,5-di(m-methylphenyl)imidazole dimer, 2-benzyl-2-dimethylamino-1-(4-morpholinophenyl)-butanone, 2-trichloromethyl-5-styryl-1,3,4-oxadiazole, 2-trichloromethyl-5-(p-cyanostyryl)-1,3,4-oxadiazole and 2-trichloromethyl-5-(p-methoxystyryl)-1,3,4-oxadiazole; halomethyl-5-triazine compounds such as 2,4-bis(trichloromethyl)-6-p-methoxystyryl-S-triazine, 2,4-bis(trichloromethyl)-6-(1-p-dimethylaminophenyl-1,3-butadienyl)-S-triazine, 2-trichloromethyl-4-amino-6-p-methoxystyryl-S-triazine, 2-(naphtho-1-yl)-4,6-bis-trichloromethyl-S-triazine, 2-(4-ethoxy-naphtho-1-yl)-4,6-bis-trichloromethyl-S-triazine, 2-(4-butoxy-naphtho-1-yl)-4,6-bis-trichloromethyl-S-triazine; and 2,2-dimethoxy-1,2-diphenylethane-1-on, 2-methyl-1-[4-(methylthio)phenyl]-2-morpholinopropanone, 1,2-benzyl-2-dimethylamino-1-(4-morpholinophenyl)-butanone-1,1-hydroxy-cyclohexyl-phenylketone, methyl benzoylbenzoate, 4-benzoyl-4'-methyl diphenyl sulfide, benzyl methyl ketal, dimethyl amino benzoate, p-isoamyl dimethylaminobenzoate, 2-n-butoxyethyl-4-dimethyl amino benzoate, 2-chlorothioxanthone, 2,4-diethylthioxanthone, 2,4-dimethylthioxanthone, isopropylthioxanthone, ethanone, 1-[9-ethyl-6-(2-methyl-benzoyl)-9H-carbazole-3-yl]-1-(o-acetyl oxime), 4-benzoyl-methyl diphenyl sulfide, 1-hydroxy-cyclohexyl-phenylketone, 2-benzyl-2-(dimethylamino)-1-[4-(4-morpholinyl)phenyl]-1-butanone, 2-(dimethylamino)-2-[(4-methylphenyl)methyl]-1-[4-(4-morpholinyl)phenyl]-1-butanone, α-dimethoxy-α-phenylacetophenone, phenyl bis(2,4,6-trimethylbenzoyl)phosphine oxide, and 2-methyl-1-[4-(methylthio)phenyl]-2-(4-morpholinyl)-1-propanone, and 1,2-octadione.

Also, a photopolymerization initiator having a tertiary amine structure can be used. Such a photopolymerization initiator has a tertiary amine structure per molecule, which is an oxygen quencher, so that the photopolymerization initiator is advantageous in that radicals produced from the photopolymerization initiator is less likely to be deactivated by oxygen, resulting in an increase in sensitivity.

Commercially-available products of the photopolymerization initiator having a tertiary amine structure include Irgacure 907, Irgacure 369 (manufactured by BASF Japan Ltd.) and Hicure ABP (manufactured by Kawaguchi Chemical Co., Ltd.), for example.

The content of the photopolymerization initiator used in the present invention is needed to be such an amount that is able to form the color layers of the color filter. However, the content is preferably in the range of to 40% by weight, particularly preferably in the range of 5 to 35% by weight, in the solid content of the photosensitive color resin composition of the present invention. This is because when the content of the photopolymerization initiator is less than the range, there is a possibility of insufficient radical polymerization, resulting in poor curing and a decrease in curability; moreover, when the content is more than the range, there is an possibility of an excessive amount of radicals produced, obtaining poor results in radical polymerization or obtaining a high possibility of side reactions and thus a deterioration in stability over time.

<Other Components>

In addition, the photosensitive color resin composition for color filters may further comprise other components, as needed. Among the above-mentioned binder resins, it is preferable that the composition comprise the alkali-soluble resin having an acidic functional group such as carboxyl group, from the viewpoint of development property.

The photosensitive color resin composition for color filters may further contain additives such as a sensitizer, a polymerization terminator, a chain transfer agent, a leveling agent, a plasticizer, a surfactant, an antifoaming agent, and a silane coupling agent.

<Content Ratio of the Components in the Photosensitive Color Resin Composition>

In the photosensitive color resin composition of the present invention, the content of the pigment (A) is not particularly limited as long as it is possible to color the color layers of the color filter desired colors in the formation of the color layers using the photosensitive color resin composition of the present invention. The content depends on the type of the pigment used; however, it is preferably in the range of 1 to 70% by weight, more preferably in the range of 10 to 60% by weight, in the solid content of the photosensitive color resin composition. The reason is as follows: if the pigment content is more than the range, there is a possibility of a decrease in development property or scumming when forming the color layers of the color filter using the photosensitive color resin composition of the present invention. If the pigment content is less than the range, there is a possibility of insufficient coloring of the color layers when forming the color layers of the color filter using the photosensitive color resin composition of the present invention.

In the photosensitive color resin composition of the present invention, the content of the polymer (B) having tertiary or lower amines and the amine-reactive low molecular compound (C) reactive with the amines in the polymer, and/or the reactant therebetween, is appropriately selected based on the pigment, as described above under "I. Pigment dispersion liquid and the method for producing the same". An indication is such that the total content of the polymer (B) having tertiary or lower amines and the amine-reactive low molecular compound (C) reactive with the amines in the polymer, and/or the reactant therebetween, is preferably in the range of 1% by weight to 60% by weight, more preferably 2% by weight to 30% by weight, particularly preferably 4% by weight to 20% by weight, in the solid content of the photosensitive color resin composition. When the total content is less than 1% by mass in the solid content of the photosensitive color resin composition, there is a possible difficulty in uniformly dispersing the pigment. On the other hand, when the total content is more than 60% by mass in the solid content of the photosensitive color resin composition, there is a possible decrease in curability, development property and luminance.

The content of the solvent used in the photosensitive color resin composition of the present invention, is not particularly limited as long as it is possible to form the color layers with accuracy. In general, in the photosensitive color resin composition, the solvent content is preferably in the range of 65% by weight to 95% by weight, particularly preferably in the range of 70% by weight to 90% by weight. This is because excellent applicability can be obtained when the solvent content is in the range.

The content of the binder resin such as the alkali-soluble resin, which is used as needed in the photosensitive color resin composition of the present invention, is preferably in the range of 1% by weight to 70% by weight, more preferably in the range of 5% by weight to 60% by weight, particularly preferably in the range of 10% by weight to 40% by weight, in the solid content of the photosensitive color resin composition, from the viewpoint of curability and development property.

The content of the surfactant used in the photosensitive color resin composition of the present invention, is preferably in the range of 0.001% by weight to 5% by weight, in the total solid content of the photosensitive color resin composition.

<Method for Producing the Photosensitive Color Resin Composition>

The method for producing the photosensitive color resin composition for color filters is not particularly limited as long as the pigment dispersion liquid of the present invention is prepared in advance and used for the production. The composition can be produced by adding the polyfunctional monomer (E), the photopolymerization initiator (F) and other components to the pigment dispersion liquid and uniformly mixed them or uniformly dispersing the components in the pigment dispersion liquid. Or, the photosensitive color resin composition for color filters can be produced in such a manner that the polyfunctional monomer (E), the photopolymerization initiator (F) and other components are mixed with, dispersed in or dissolved in the solvent to prepare a photosensitive component solution, and the solution is mixed with the pigment dispersion liquid prepared, followed by a dispersion treatment as needed, thus obtaining the photosensitive color resin composition.

III. Ink-jet Ink

The ink-jet ink of the present invention comprises the pigment dispersion liquid of the present invention. Due to comprising the pigment dispersion liquid of the present invention, the thus-obtained ink-jet ink offers stable ejection, resistance to deflection of ejecting direction, and resistance to clogging.

The ink-jet ink of the present invention can be suitably used in the production of the color filter which will be described below.

As the ink-jet ink of the present invention, the pigment dispersion liquid can be used as it is. However, the ink-jet ink may comprise a binder resin and other additives as needed, to the extent not to hinder the effects of the present invention. Example of the additives include conventionally-known additives such as an anti-drying agent (wetting agent), an anti-discoloration agent, an emulsion stabilizer, a penetration enhancer, an ultraviolet absorbing agent, a fungicide, a pH adjusting agent, a surface tension adjusting agent, an anti-foaming agent, a viscosity modifier, a dispersing agent, a dispersion stabilizer, a corrosion inhibitor and a chelating agent. In general, these additives are added to the pigment dispersion liquid thus produced after the production of the pigment dispersion liquid. However, they can be added upon the production of the liquid. It is possible to print various kinds of characters and patterns, using the ink thus obtained.

In the case of using the ink-jet ink of the present invention in the production of the color filter which will be described below, the ink can be used in spite of the type (thermosetting/photosensitive), as long as the ink comprises at least the pigment dispersion liquid of the present invention.

In the case of using the thermosetting ink-jet ink of the present invention in the production of the color filter which will be described below, the ink comprises at least the pigment dispersion liquid of the present invention, a thermosetting resin and a solvent. As the dispersion medium of the pigment dispersion liquid, a solvent is preferably used. In addition, the ink may further comprise a thermal polymerization initiator and other components, as needed.

As the thermosetting resin used in the thermosetting ink-jet ink, a resin having two or more epoxy groups per molecule is preferably used. Preferred epoxy groups are glycidyl group, an oxyethylene group and an epoxycyclohexyl group.

The epoxy resin preferably has a weight average molecular weight of 3,000 to 20,000.

Concrete examples of the resin having two or more epoxy groups per molecule include bisphenol A type epoxy resin, bisphenol F type epoxy resin, brominated bisphenol A type epoxy resin, bisphenol S type epoxy resin, diphenyl ether type epoxy resin, hydroquinone type epoxy resin, naphthalene type epoxy resin, biphenyl type epoxy resin, fluorene type epoxy resin, phenol novolac type epoxy resin, o-cresol novolac type epoxy resin, trishydroxyphenylmethane type epoxy resin, tetraphenylolethane type epoxy resin, dicyclopentadiene phenol type epoxy resin, hydrogenerated bisphenol A type epoxy resin, polyol-containing bisphenol A type epoxy resin, polypropylene glycol type epoxy resin, glycidyl ester type epoxy resin, glycidyl amine type epoxy resin, glyoxal type epoxy resin, alicyclic epoxy resin and heterocyclic epoxy resin. Particularly preferred concrete example include alicyclic epoxy resin such as EHPE3150 (manufactured by DAICEL Chemical Industries, Ltd.) and bisphenol A type novolac epoxy resin such as Epikote 157S70 (manufactured by Japan Epoxy Resins Co., Ltd.)

A different example of the resin having two or more epoxy groups per molecule is an acrylic copolymer obtained by copolymerizing a monomer having an epoxy group and an ethylenically unsaturated double bond per molecule with a monomer having an ethylenically unsaturated double bond, the copolymer having a weight average molecular weight of 5,000 to 20,000. Examples of the monomer having an epoxy group and an ethylenically unsaturated double bond per molecule, include glycidyl(meth)acrylate, methyl glycidyl(meth) acrylate, and 3,4-epoxycyclohexyl(meth)acrylate. Examples of the monomer having an ethylenically unsaturated double bond include mono(meth)acrylates and compounds copolymerzable with them. Preferred examples include alicyclic hydrocarbon-containing acrylates cyclohexyl(meth)acrylate, dicyclopentanyl(meth)acrylate and adamantyl(meth)acrylate, from the viewpoint of excellent yellowing resistance and heat resistance.

The content of the thermosetting resin is 5% by weight to 20% by weight, more preferably 10% by weight to 15% by weight, in the solid content of the ink. When the content is less than the lower limit of the content, there is a possibility of insufficient heat-curability. When the content is more than the upper limit, there is a possibility of poor storage stability.

The thermosetting ink-jet ink may comprise a photosensitive or non-photosensitive resin composition, which has been used as a resin for color filters, as well as the above-described epoxy resin.

As the solvent used in the thermosetting ink-jet ink of the present invention, those mentioned above as the solvent used in the dispersion liquid, can be suitable used. Particularly preferred are propylene glycol monomethyl ether acetate, propylene glycol monomethyl ether and butyl carbitol acetate. The solvents may be used alone or in combination of two or more kinds and used at a ratio of 60% by weight to 85% by weight, relative to the whole ink. When the solvent amount is less than the lower limit, there is a possibility of too high viscosity. When the solvent amount is more than the upper limit, there is a possibility of too low pigment concentration and thus a difficulty in obtaining a desired color.

The thermosetting ink-jet ink of the present invention may comprise a thermal polymerization initiator. The thermal polymerization initiator is not particularly limited; however, it is preferably an acid anhydride from the viewpoint of excellent storage stability and a small amount of heat generation. Examples of the acid anhydride include polycarboxylic acid anhydride as follows: aliphatic polycarboxylic acid dianhydride such as aliphatic or alicyclic dicarboxylic acid dianhydrides including phthalic anhydride, itaconic anhydride, succinic anhydride, citraconic anhydride, maleic anhydride, hexahydrophthalic anhydride, dimethyltetrahydrophthalic anhydride and himic anhydride; and aromatic polycarboxylic acid dianhydrides such as pyromellitic dianhydride, trimellitic anhydride and benzophenonetetracarboxylic anhydride.

The thermal polymerization initiators can be used alone or in combination of two or more kinds. The content is preferably 1 to 100 parts by weight, more preferably 5 to 50 parts by weight, relative to the thermosetting resin of 100 parts by weight. When the content is less than the lower limit, there is a possibility of poor curability. When the content is more than the upper limit, it is possible that the coating film thus obtained has poor adhesion to substrates.

The method for producing the thermosetting ink-jet ink used in the color filter, is not particularly limited. However, it is preferable to produce the thermosetting ink-jet ink by adding a thermosetting resin, a thermal polymerization initiator as needed, and other components to the pigment dispersion liquid of the present invention, and uniformly mixing them or uniformly dispersing the components in the pigment dispersion liquid.

In the case of using the photosensitive ink-jet ink of the present invention in the production of the color filter which will be described below, the ink may comprise at least the pigment dispersion liquid of the present invention and the polyfunctional monomer (E) and photopolymerization initiator (F). It may further contain other components, as needed. As the dispersion medium, a solvent and/or a polymerizable monomer is used.

These components are the same as those described above under "I. Pigment dispersion liquid . . . " and "II. Photosensitive color resin composition." Accordingly, they are not described here.

In the photosensitive ink-jet ink used in the color filter, the content of the polyfunctional monomer (E) is preferably in the range of 5 to 60% by weight, more preferably in the range of 10 to 40% by weight, relative to the solid content of the ink-jet ink. This is because when the content of the polyfunctional monomer is too small, it is possible that the ink is not sufficiently cured and melts off the exposed region; moreover, when the content of the compound having the polyfunctional monomer is too large, it is possible that the unexposed region is not developed and the ink-jet head is clogged.

In the photosensitive ink-jet ink used in the color filter, the content of the photopolymerization initiator (F) is needed to be such an amount that is able to form the color layers of the color filter. However, the content is preferably in the range of 3 to 40% by weight, particularly preferably in the range of 5 to 35% by weight, in the solid content of the photosensitive ink-jet ink of the present invention. This is because when the content of the photopolymerization initiator is less than the range, there is a possibility of insufficient radical polymerization, resulting in poor curing and a decrease in curability; moreover, when the content is more than the range, there is a possibility of an excessive amount of radicals produced, obtaining poor results in radical polymerization or obtaining a high possibility of side reactions and thus a deterioration in stability over time.

The method for producing the photosensitive ink-jet ink used in the color filter, is not particularly limited. The ink can be produced by adding the polyfunctional monomer (E), the photopolymerization initiator (F) and other components to the pigment dispersion liquid of the present invention and uniformly mixing them or uniformly dispersing the components in the pigment dispersion liquid. Or, the photosensitive ink-jet ink can be produced in such a manner that the polyfunctional monomer (E), the photopolymerization initiator (F) and other components are mixed with, dispersed in or dissolved in the dispersion medium (D) to prepare a photosensitive component solution, and the solution is mixed with the pigment dispersion liquid prepared, followed by a dispersion treatment as needed, thus obtaining the photosensitive ink-jet ink.

IV. Color Filter

Next, the color filter of the present invention will be described. The color filter of the present invention comprises color layers formed with the photosensitive color resin composition or the ink-jet ink.

Such a color filter of the present invention will be described in reference to a FIGURE. FIG. 1 is a sectional view schematically showing an example of the color filter of the present invention. As shown in FIG. 1, the color filter 10 comprises a transparent substrate 1, a light-shielding part 2 being formed in pattern on the transparent substrate 1 and having openings, and color layers 3 formed on the openings of the light-shielding part 2.

The color layers are formed with the photosensitive color resin composition of the present invention or the ink-jet ink of the present invention.

According to the present invention, the color filter comprises color layers formed with the photosensitive color resin composition of the present invention or the ink-jet ink of the present invention. Thus, the color filter can be a color layer with high adhesion to the substrate. Therefore, it is possible to obtain a color filter which is resistant to problems such as a decrease in transparency or contrast, display defects, detachment of ITO layer and deterioration in sealing properties during a liquid crystal cell production process. Also, it is possible to increase the pigment concentration of the photosensitive color resin composition or ink-jet ink of the present invention and to use a fine pigment therein. Therefore, because of comprising the color layers formed with such a photosensitive color resin composition, the color filter can be a color filter provided with high color reproducibility, high definition, high luminance and high contrast.

Hereinafter, the components of the color filter of the present invention will be described.

<Transparent Substrate>

In the color filter of the present invention, the transparent substrate is not particularly limited as long as it is a substrate transparent to visible light. As the transparent substrate, transparent substrates used in general color filters can be used. Concrete examples thereof include non-flexible transparent rigid materials such as quartz glass, alkali-free glass and synthetic quartz plates, and transparent flexible materials such as transparent resin films and optical resin plates.

The thickness of the transparent substrate is not particularly limited. However, depending on the intended use of the color filter of the present invention, one having a thickness of about 100 μm to 1 mm for example, can be used.

<Light-shielding Part>

In the color filter of the present invention, the light-shielding part is formed in pattern on the transparent substrate and can be those formed as the light-shielding part on general color filters. In the case of forming the color layers by the ink-jet method, the light-shielding part is a partition which acts to attach the ink to a predetermined region. It can increase the contrast of displayed images when formed between the color layers and formed to surround the outside of the color layer forming regions.

The light-shielding part can be a thin metal layer of chrome or the like produced by sputtering, vacuum deposition, etc. Or, the light-shielding part can be a resin layer in which light-shielding particles such as fine particles of carbon, particles of metal oxide, particles of inorganic pigment or particles of organic pigment, in a resin binder. In the case of the resin layer containing the light-shielding particles, there may be mentioned a method of patterning using a photosensitive resist and by development; a method of patterning using an ink-jet ink containing light-shielding particles, and a method of thermal-transferring a photosensitive resist.

The thickness of the light-shielding part is about 0.1 to 0.2 μm when the part is a thin metal layer, and about 0.5 to 2.5 μm when the part is a light-shielding resin layer.

<Color Layers>

The color layers are formed with the photosensitive color resin composition or the ink-jet ink of the present invention.

The alignment of the color layers is not particularly limited and can be a general alignment such as a stripe type, a mosaic type, a triangle type, or a four-pixel aligned type, etc. The width, area, etc., of the color layers can be appropriately determined.

The thickness of the color layers is generally in the range of 1 to 5 μm, preferably in the range of 1 to 2.5 μm.

The method for forming the color layers in the case of using the photosensitive resin composition of the present invention, is as follows. First, the photosensitive resin composition containing a blue (B) pigment, the photosensitive resin composition containing a green (G) pigment, and the photosensitive resin composition containing a red (R) pigment, are prepared. Next, each photosensitive resin composition is applied onto a transparent substrate to form a photosensitive resin layer. This layer is subjected in patterning in a desired shape by lithography, thus obtaining a single color pattern. This process is repeated with each photosensitive resin composition, thereby obtaining color layers.

The method for forming the color layers in the case of using the thermosetting ink-jet ink of the present invention, is as follows. First, the ink-jet ink containing a blue pigment, the ink-jet ink containing a green pigment, and the ink-jet ink containing a red pigment, are prepared. Then, to a region for forming a color layer of each color (R, G or B) defined on the transparent substrate by the patterned light-shielding part, the ink-jet ink of the corresponding color is selectively attached to form an ink layer of each color.

Next, the ink layers of the three colors are dried and then heated to cure the ink layers, thus obtaining color layers. As needed, a post-applied bake can be carried out between the drying and heating.

V. Toner for Electrophotographic Printing

The toner for electrophotographic printing of the present invention (hereinafter may be simply referred to as "toner") comprises the pigment dispersion liquid of the present invention. High coloring ability and higher pigment concentration than ever before, can be obtained by using the pigment dispersion liquid of the present invention. Therefore, images produced with the toner for electrophotographic printing of the present invention are higher-definition images.

It is preferable to produce the toner for electrophotographic printing by adding a charge control agent and a release agent to the pigment dispersion liquid of the present invention.

The charge control agent is used to improve the charge properties of a toner.

The charge control agent is not particularly limited as long as it is one that is generally used as a charge control agent for toners. Among charge control agents, preferred are charge control agents with positively- or negatively-charging property, from the viewpoint of having high compatibility with polymerizable monomers and being able to provide stable charge property (charging stability) to toner particles. From the viewpoint of obtaining a positively-charged toner, a charge control resin with positively charging property is more preferred.

Examples of the charge control resin with positively charging property include nigrosine dyes, quaternary ammonium salts, triaminotriphenylmethane compounds and imidazole compounds. Also, preferably used as the charge control resin are polyamine resin and quaternary ammonium group- and quaternary ammonium base-containing copolymers.

Examples of the charge control resin with negatively charging property include azo dyes containing a metal such as Cr, Co, Al or Fe, and metal compounds of salicylic acid and alkylsalicylic acid. Also, preferably used as the charge control resin include sulfonic acid group-, sulfonic acid base-, carboxylic acid group- and carboxylic acid base-containing copolymers.

In the present invention, desirably, the charge control agent is used in an amount of generally 0.01 to 10 parts by mass, preferably 0.03 to 8 parts by mass, relative to the monovinyl monomer of 100 parts by mass. When the amount of the charge control agent added is less than 0.01 parts by mass, there is a possibility of fog generation. When the amount is more than 10 parts by mass, there is a possibility of soiling to prints.

The release agent is used to prevent attachment to the fixing roller.

By adding the release agent, it is possible to improve the releasing property of the toner from the fixing roller upon fixing. The releasing agent is not particularly limited as long as it is one which is generally used as a releasing agent for toner. Examples thereof include low-molecular-weight polyolefin waxes and modified waxes thereof; natural plant waxes such as jojoba; petroleum waxes such as paraffin; mineral waxes such as ozokerite; synthetic waxes such as Fischer-Tropsch wax; and polyalcohol esters such as dipentaerythritol ester. Preferred are polyalcohol esters because it is possible to gain a balance between storage stability and low-temperature fixability. These release agents may be used alone or in combination of two or more kinds.

The release agent is preferably used in an amount of 0.1 to 30 parts by mass, more preferably 1 to 20 parts by mass, relative to the monovinyl monomer of 100 parts by mass.

The method for producing the toner for electrophotographic printing may be a conventionally-known method and is not particularly limited. There may be used any of the pulverization method and the polymerization method. Examples of the polymerization method include an emulsion polymerization agglomeration method, a dispersion polymerization method, a suspension polymerization method and a solution suspension method.

In the case of using the pulverization method, first, a charge control agent, a release agent and other components are added to the pigment dispersion liquid and mixed. They are mixed with a ball mill, a V-type mixer, HENSCHEL MIXER (product name), a high-speed dissolver, an internal mixer or a Forberg mixer, for example. Next, using a pressure kneader, a biaxial kneading extruder, a roller or the like, the resulting mixture is kneaded while heating. The thus-obtained kneaded product is coarsely pulverized with a pulverizer such as a hammer mill, a cutter mill, a roller mill or the like. Moreover, the resultant is finely pulverized with a pulverizer such as a jet mill or high-speed rotating pulverizer and then classified with a classifier such as an air classifier or airflow classifier, thus obtaining toner particles with a desired particle diameter.

The present invention is not limited by the above-mentioned embodiments. The above-mentioned embodiments are examples, and any that has the substantially same essential features as the technical ideas described in claims of the present invention and exerts the same effects and advantages is included in the technical scope of the present invention.

EXAMPLES

Hereinafter, the present invention will be explained further in detail, with reference to examples. However, the scope of the present invention may not be limited to the following examples.

(Polymer (B) having Amines; Production of Polymer Solution B1)

A 500 mL four-necked round-bottom separable flask was equipped with a condenser tube, a dropping funnel, a nitrogen inlet, a stirrer and a thermometer. Tetrahydrofuran (THF) of 250 parts by weight and dimethylketene methyl trimethylsilyl acetal of 2.32 parts by weight, which is an initiator, were poured into the flask through the dropping funnel, followed by sufficient nitrogen substitution. Then, 0.2 part by weight of 1 mol/L acetonitrile solution of tetrabutylammonium m-chlorobenzoate, which is a catalyst, was injected with a syringe. Methyl methacrylate (hereinafter may be referred to as MMA) of 93.3 parts by weight was added dropwise with the dropping funnel for 60 minutes. While cooling the separable flask, the temperature was kept below 40° C. One hour later, dimethylaminoethyl methacrylate (hereinafter may be referred to as DMMA) of 40.0 parts by weight was added dropwise for 20 minutes. After one hour reaction, methanol of 0.5 parts by mass was added to terminate the reaction. The thus-obtained copolymer THF solution was reprecipitated in hexane, filtrated, dried in vacuum and then purified, thus obtaining a polymer. To the amine-containing polymer obtained in this manner of 60 parts by weight, propylene glycol monomethyl ether acetate (hereinafter may be referred to as PGMEA) of 40 parts by weight was added and uniformly mixed to obtain a polymer solution B1. For the polymer solution B1, GPC was measured with HLC-8220 equipped with an RI detector (manufactured by Tosoh Corporation), using THF as the developing solvent and a molecular weight standard polymer as the standard polystyrene, thus obtaining the molecular weight distribution and mass average molecular weight. The amine value was 115 mg KOH/g. The mass average molecular weight Mw was 9,900. The number average molecular weight Mn was 8,320. The molecular weight distribution Mw/Mn was 1.19 (MMA/DMMA mass ratio: 7/3).

(Method for Measuring the Cationization Rate of Amines in the Polymer B)

Into an NMR sample tube, 1 g of a solution obtained by mixing 9% by mass of the polymer (purified substance) containing cationized amines and 91% by mass of chloroform for D1NMR was poured and measured for the 13C-NMR spectrum with a nuclear magnetic resonator (FT NMR, JNM-AL400 manufactured by JEOL Ltd.) in the condition of room temperature and a cumulated number (the frequency of scanning) of 10,000. The rate (%) of the number of cationized amines relative to the total number of amines, was calculated from the rate of, of the above-obtained spectral data, the value of the integral of the peak(s) for carbon atoms adjacent to nitrogen atoms and the value of the integral of the peak(s) for the carbon atoms adjacent to the nitrogen atoms but not cationized. The calculated value was found not to be different from the theoretical cationization rate (%). The value obtained by this method may be referred to as amine cationization rate.

(Production of Acid-group Containing Binder Resin 1)

A mixed solution of benzyl methacrylate of 30 g, styrene of 38 g, methacrylic acid of 18 g and t-butylperoxy-2-ethylhexanoate (PERBUTYL 0 manufactured by NOF Corporation) of 10 g was added dropwise for 3 hours to a polymerization vessel filled with propylene glycol monomethyl ether acetate of 150 g at 100° C. and under a nitrogen flow. After the dropwise addition was completed, the resultant was heated further for 3 hours, thereby obtaining a resin solution. This resin had a polystyrene equivalent weight average molecular weight of 8,000.

Next, to the thus-obtained resin solution, glycidyl methacrylate of 14 g, triethylamine of 0.2 g and p-methoxyphenol of 0.05 g were added and heated at 110° C. for hours for reaction. The thus-obtained acid group-containing binder resin solution had a solid content of 40% by weight, an acid value of 75 mg KOH/g and a polystyrene equivalent weight average molecular weight of 10,000.

Example 1

Production of Pigment Dispersion Liquid

The polymer solution B1 (a PGMEA solution, solid content 60% by weight) of 10.52 parts by weight, which is the polymer (B) having tertiary or lower amines, the acid group-containing binder resin 1 (solid content 40% by weight) of 6.5 parts by weight, and PGMEA of 69.8 parts by weight, which is the dispersion medium (D), were mixed. The mixture was subjected to agitation mixing with a dissolver and thus uniformly dissolved. To the resulting solution, Light Ester P-2M (product name, manufactured by Kyoeisha Chemical Co., Ltd., hereinafter may be referred to as P-2M) of 0.19 part by weight, which is the amine-reactive low molecular compound (C) reactive with the amines in the polymer, and C.I. Pigment Red 254 of 13.0 parts by weight, which is the pigment (A), were added and the mixture was subjected to agitation mixing with a dissolver. In the mixed solution, the pigment (A) was dispersed by a beads mill and 0.1 mm zirconia beads, while reacting the polymer (B) with the low molecular compound (C), thus producing the pigment dispersion liquid of Example 1. The dispersion was initiated within 30 minutes after the addition of Light Ester P-2M and C.I. Pigment Red 254. The rate of the total number of functional groups reactive with the amine in the low molecular compound (C) relative to the total number of the amines in the polymer (B) (hereinafter referred to as amine cationization rate) was 5%. The measured result shows that there is no different between the cationization rate obtained above by NMR and the above-mentioned theoretical cationization rate.

MMA means methyl methacrylate; DMMA means dimethylaminoethyl methacrylate; BzMA means benzyl methacrylate; MAA means methacrylic acid; and PGMEA means propylene glycol monomethyl ether acetate.

Example 2

Production of Pigment Dispersion Liquid

The pigment dispersion liquid of Example 2 was produced in the same manner as Example 1, except the following: the polymer solution B1 was 10.2 parts by weight; the acid group-containing binder resin 1 was 6.5 parts by weight; PGMEA was 69.8 parts by weight; Light Ester P-2M was 0.38 part by weight; and C.I. Pigment Red 254 was 13.0 parts by weight. The amine cationization rate was 30%. As with Example 1, measurement and confirmation was carried out by NMR.

Example 3

Production of Pigment Dispersion Liquid

The pigment dispersion liquid of Example 3 was produced in the same manner as Example 1, except the following: the polymer solution B1 was 9.13 parts by weight; the acid group-containing binder resin 1 was 6.5 parts by weight; PGMEA was 70.3 parts by weight; Light Ester P-2M was 1.02 parts by weight; and C.I. Pigment Red 254 was 13.0 parts by weight. The amine cationization rate was 30%. As with Example 1, measurement and confirmation was carried out by NMR.

Example 4

Production of Pigment Dispersion Liquid

The pigment dispersion liquid of Example 4 was produced in the same manner as Example 1, except the following: the polymer solution B1 was 8.28 parts by weight; the acid group-containing binder resin 1 was 6.5 parts by weight; PGMEA was 70.7 parts by weight; Light Ester P-2M was 1.53 parts by weight; and C.I. Pigment Red 254 was 13.0 parts by weight. The amine cationization rate was 50%. As with Example 1, measurement and confirmation was carried out by NMR.

Example 5

Production of Pigment Dispersion Liquid

The pigment dispersion liquid of Example 5 was produced in the same manner as Example 1, except the following: the polymer solution B1 was 7.57 parts by weight; the acid group-containing binder resin 1 was 6.5 parts by weight; PGMEA was 71.0 parts by weight; Light Ester P-2M was 1.96 parts by weight; and C.I. Pigment Red 254 was 13.0 parts by weight. The amine cationization rate was 70%. As with Example 1, measurement and confirmation was carried out by NMR.

Example 6

Production of Pigment Dispersion Liquid

The pigment dispersion liquid of Example 6 was produced in the same manner as Example 1, except the following: the polymer solution B1 was 6.97 parts by weight; the acid group-containing binder resin 1 was 6.5 parts by weight; PGMEA was 71.2 parts by weight; Light Ester P-2M was 2.32 parts by weight; and C.I. Pigment Red 254 was 13.0 parts by weight. The amine cationization rate was 90%. As with Example 1, measurement and confirmation was carried out by NMR.

Example 7

Production of Pigment Dispersion Liquid

The pigment dispersion liquid of Example 7 was produced in the same manner as Example 1, except the following: the polymer solution B1 was 10.10 parts by weight; the acid group-containing binder resin 1 was 6.5 parts by weight; PGMEA was 70.0 parts by weight; benzyl chloride (may be referred to as BzCl), which is the low molecular compound (C) reactive with the amines in the polymer, was 0.44 part by weight; and C.I. Pigment Red 254 was 13.0 parts by weight.

The amine cationization rate was 30%. As with Example 1, measurement and confirmation was carried out by NMR.

Example 8

Production of Pigment Dispersion Liquid

The pigment dispersion liquid of Example 8 was produced in the same manner as Example 1, except the following: the polymer solution B1 was 9.78 parts by weight; the acid group-containing binder resin 1 was 6.5 parts by weight; PGMEA was 70.1 parts by weight; methyl p-toluenesulfonate (may be referred to as MPTS), which is the low molecular compound (C) reactive with the amines in the polymer, was 0.63 part by weight; and C.I. Pigment Red 254 was 13.0 parts by weight. The amine cationization rate was 30%. As with Example 1, measurement and confirmation was carried out by NMR.

Example 9

Production of Pigment Dispersion Liquid

The pigment dispersion liquid of Example 9 was produced in the same manner as Example 1, except the following: BYK6919 (a commercially-available dispersing agent manufactured by BYK Japan KK, amine value 121 mg KOH/g), which is the polymer solution B, was 9.13 parts by weight; the acid group-containing binder resin was 6.5 parts by weight; PGMEA was 70.3 parts by weight; Light Ester P-2M was 1.02 parts by weight; and C.I. Pigment Red 254 was 13.0 parts by weight. The amine cationization rate was 30%. As with Example 1, measurement and confirmation was carried out by NMR.

Example 10

Production of Pigment Dispersion Liquid

The pigment dispersion liquid of Example 10 was produced in the same manner as Example 1, except the following: the polymer solution B1 was 5.48 parts by weight; The acid group-containing binder resin 1 was 9.75 parts by weight; PGMEA was 71.2 parts by weight; Light Ester P-2M was 0.61 part by weight; and C.I. Pigment Blue 15:6 was 13.0 parts by weight. The amine cationization rate was 30%. As with Example 1, measurement and confirmation was carried out by NMR.

Example 11

Production of Pigment Dispersion Liquid

The pigment dispersion liquid of Example 11 was produced in the same manner as Example 1, except the following: the polymer solution B1 was 5.48 parts by weight; the acid group-containing binder resin 1 was 9.75 parts by weight; PGMEA was 71.2 parts by weight; Light Ester P-2M was 0.61 part by weight; and C.I. Pigment Green 58 was 9.1 parts by weight and C.I. Pigment Yellow 150 was 3.9 parts by weight. The amine cationization rate was 30%. As with Example 1, measurement and confirmation was carried out by NMR.

Comparative Example 1

Production of Pigment Dispersion Liquid

The pigment dispersion liquid of Comparative Example 1 was produced in the same manner as Example 1, except the following: the polymer solution B1 was 10.83 parts by weight; the acid group-containing binder resin 1 was 6.5 parts by weight; PGMEA was 69.7 parts by weight; Light Ester P-2M was not added; and C.I. Pigment Red 254 was 13.0 parts by weight.

Comparative Example 2

Production of Pigment Dispersion Liquid

The pigment dispersion liquid of Comparative Example 2 was produced in the same manner as Example 1, except the following: the polymer solution B1 was 9.13 parts by weight; the acid group-containing binder resin 1 was 6.5 parts by weight; PGMEA was 70.3 parts by weight; Light Ester P-2M was not added; C.I. Pigment Red 254 was 13.0 parts by weight; and after dispersion was conducted as with Example 1, Light Ester P-2M of 1.02 parts by weight was added and the resultant was subjected to uniform agitation mixing with a dissolver. The amine cationization rate was 30%. As with Example 1, measurement and confirmation was carried out by NMR.

Comparative Example 3

Production of Pigment Dispersion Liquid

[Synthesis of Comparative Pigment Dispersing Agent 1]

The comparative pigment dispersing agent 1 having a solid content of 20% by weight, was synthesized by mixing the polymer solution B1 of 45.67 parts by weight, Light Ester P-2M of 5.1 parts by weight and PGMEA of 111.73 parts by weight and stirring the mixture at room temperature for 2 hours. The amine cationization rate was 30%. As with Example 1, measurement and confirmation was carried out by NMR.

[Preparation of Pigment Dispersion Liquid]

The pigment dispersion liquid of Comparative Example 3 was produced in the same manner as Example 1, except the following: the above-synthesized Comparative pigment dispersing agent 1 solution (solid content 20% by weight), which is the dispersing agent, was 32.5 parts by weight; the acid group-containing binder resin 1 was 6.5 parts by weight; PGMEA was 48.0 parts by weight; Light Ester P-2M was not added; and C.I. Pigment Red 254 was 13.0 parts by weight.

Comparative Example 4

Production of Pigment Dispersion Liquid

The pigment dispersion liquid of Comparative Example 4 was produced in the same manner as Example 1, except the following: BYK6919 (a commercially-available dispersing agent manufactured by BYK Japan KK, amine value 121 mg KOH/g), which is the polymer solution B, was 10.83 parts by weight; the acid group-containing binder resin 1 was 6.5 parts by weight; PGMEA was 69.7 parts by weight; Light Ester P-2M was not added; and C.I. Pigment Red 254 was 13.0 parts by weight.

Examples 12 to 20 and Comparative Examples 5 to 8

Color Photosensitive Resin Composition

Color photosensitive resin compositions of Examples to 20 and Comparative Examples 5 to 8 were each produced by using each of the pigment dispersion liquids of Examples 1 to 11 and Comparative Examples 1 to 4 and uniformly mixing the following composition with a dissolver.

<Composition of Photosensitive Color Resin Composition>
Pigment dispersion liquid: 39.56 parts by weight
Acid group-containing binder resin 1: 7.41 parts by weight
Polyfunctional monomer (dipentaerythritol hexaacrylate, product name KAYARAD DPHA, manufactured by: Nippon Kayaku Co., Ltd.): 4.44 parts by weight
Photopolymerization initiator (IRGACURE 369 manufactured by BASF JAPAN LTD.): 0.93 part by weight
Photopolymerization initiator (IRGACURE 907 manufactured by BASF JAPAN LTD.): 0.93 part by weight
Silane coupling agent (KBE-503 manufactured by Shin-Etsu Chemical Co., Ltd.): 0.36 part by weight
Solvent (PGMEA): 26.74 parts by weight
Solvent (3-methyl-3-methoxybutyl acetate): 20.00 parts by weight The thus-obtained color photosensitive resin compositions had a solid content of 18% by weight, each.

Example 21

Color Photosensitive Resin Composition

The color photosensitive resin composition of Example 21 was prepared by using the pigment dispersion liquid of Example 10 and uniformly mixing the following composition with a dissolver.

<Composition of Photosensitive Color Resin Composition>
Pigment dispersion liquid: 27.69 parts by weight
Acid group-containing binder resin 1: 12.24 parts by weight
Polyfunctional monomer (dipentaerythritol hexaacrylate, product name KAYARAD DPHA, manufactured by Nippon Kayaku Co., Ltd.): 4.28 parts by weight
Photopolymerization initiator (IRGACURE 907, manufactured by BASF JAPAN LTD.): 3.06 parts by weight
Silane coupling agent (KBE-503, manufactured by Shin-Etsu Chemical Co., Ltd.): 0.36 part by weight
Solvent (PGMEA): 32.73 parts by weight
Solvent (3-methyl-3-methoxybutyl acetate): 20.00 parts by weight The thus-obtained color photosensitive resin composition had a solid content of 18% by weight.

Example 22

Color Photosensitive Resin Composition

The color photosensitive resin composition of Example 22 was prepared by using the pigment dispersion liquid of Example 11 and uniformly mixing the following composition with a dissolver.

<Composition of Photosensitive Color Resin Composition>
Pigment dispersion liquid: 49.13 parts by weight
Acid group-containing binder resin 1: 6.48 parts by weight
Polyfunctional monomer (dipentaerythritol hexaacrylate, product name KAYARAD DPHA, manufactured by Nippon Kayaku Co., Ltd.): 3.81 parts by weight
Photopolymerization initiator (IRGACURE907, manufactured by BASF JAPAN LTD.): 0.44 part by weight
Photopolymerization initiator (SPEEDCURE 1311A, manufactured by Nihon Siberhegner K.K.): 0.78 part by weight
2-mercapto benzothiazole: 0.15 part by weight
Silane coupling agent (KBE-503, manufactured by Shin-Etsu Chemical Co., Ltd.): 0.36 part by weight
Solvent (PGMEA): 19.19 parts by weight
Solvent (3-methyl-3-methoxybutyl acetate): 20.00 parts by weight The thus-obtained color photosensitive resin composition had a solid content of 18% by weight.

[Evaluation]

(1) Evaluation of Viscosity of Pigment Dispersion Liquid

For the pigment dispersion liquids obtained in Examples and Comparative Examples, the viscosity at 25.0±1.0° C. was measured with a vibration viscometer. Viscosity evaluation was carried out according to the following criterion.
○: 10 mPa·s or less
Δ: 11 mPa·s or more and 20 mPa·s or less
x: 21 mPa·s or more (2) Dispersion Stability of Pigment Dispersion Liquid For the pigment dispersion liquid obtained in Examples and Comparative Examples, the viscosity at 25° C. was measured in the same manner as above before and after the storage of 7 days. The resulting rates of viscosity change before and after the storage, were compared. Evaluation of dispersion stability was carried out according to the following criterion.
○: The rate of viscosity change before and after the storage is less than 5%.
Δ: The rate of viscosity change before and after the storage is 5% or more and less than 10%.
x: The rate of viscosity change before and after the storage is 10% or more.

(3) Formation of Color Layer

The photosensitive color resin composition was spin-coated onto an alkali-washed glass substrate to form a layer for forming a color layer, the layer comprising the photosensitive color resin composition. Then, the layer was dried by pre-baking at room temperature for 3 minutes and then on a hot plate at 80° C. for 3 minutes and thus dried. Next, the dried layer for forming a color layer was cured by mask exposure with an ultra high pressure mercury lamp at 100 mJ/cm².

The layer was developed by spin development with the use of 0.05 wt % potassium hydroxide (KOH) as a developing solution, allowing the image to be in contact with the developing solution for 60 seconds, and then washing the image with pure water. Thereafter, the patterned substrate was post-baked in an oven at 230° C. for 30 minutes. The resulting color layer comprising the post-baked layer for forming a color layer, had a thickness of 1.9 μm.

(4) Adhesion

Line pattern having a line width of 1 μm to 100 μm were exposed. The minimum line width of the line pattern remaining undissolved and adhering to the substrate after the development process, was measured and evaluated according to the following criterion. The results are shown in Table 6.
○: Line having a line width of 10 μm or less adheres to the substrate.
Δ: Line having a line width of more than 10 μm and 20 μm or less adheres to the substrate.
x: No line having a line width of 20 μm or less adheres to the substrate.

(5) Development Property

The time between the dissolution and development of the unexposed region in the color layer formation, was measured and evaluated according to the following criterion. The completion of the development was visually judged. The results are shown in Table 6.
○: Development is completed in 10 seconds to 30 seconds.
Δ: Development is completed in 31 seconds to 60 seconds.
x: Development is not completed in 60 minutes.

TABLE 6

| Photo-sensitive color resin composition | Pigment dispersion liquid | Timing of pouring the low molecular compound (C) | BzCl | P-2M | MPTS | Cationization rate | Viscosity evaluation | Dispersion stability | adhesion | Development property |
|---|---|---|---|---|---|---|---|---|---|---|
| Example 12 | Example 1 | Upon dispersion | | Yes | | 5 | Δ | Δ | ○ | Δ |
| Example 13 | Example 2 | Upon dispersion | | Yes | | 10 | ○ | ○ | ○ | Δ |
| Example 14 | Example 3 | Upon dispersion | | Yes | | 30 | ○ | ○ | ○ | ○ |
| Example 15 | Example 4 | Upon dispersion | | Yes | | 50 | ○ | ○ | ○ | ○ |
| Example 16 | Example 5 | Upon dispersion | | Yes | | 70 | ○ | ○ | ○ | ○ |
| Example 17 | Example 6 | Upon dispersion | | Yes | | 90 | Δ | Δ | Δ | ○ |
| Example 18 | Example 7 | Upon dispersion | Yes | | | 30 | ○ | ○ | ○ | Δ |
| Example 19 | Example 8 | Upon dispersion | | | Yes | 30 | ○ | ○ | ○ | ○ |
| Example 20 | Example 9 | Upon dispersion | | Yes | | 30 | ○ | ○ | ○ | ○ |
| Example 21 | Example 10 | Upon dispersion | | Yes | | 30 | ○ | ○ | ○ | ○ |
| Example 22 | Example 11 | Upon dispersion | | Yes | | 30 | ○ | ○ | ○ | Δ |
| Comparative Example 5 | Comparative Example 1 | None | | | | — | X | X | Δ | Δ |
| Comparative Example 6 | Comparative Example 2 | After dispersion | | Yes | | 30 | X | X | X | Δ |
| Comparative Example 7 | Comparative Example 3 | Synthesized before dispersion | | Yes | | 30 | Δ | X | X | ○ |
| Comparative Example 8 | Comparative Example 4 | None | | | | — | X | X | Δ | Δ |

All the results are shown in Table 6. More particularly, the pigment dispersion liquids of Examples 1 to 11 produced by the production method of the present invention, had lower viscosity and higher dispersion stability than the pigment dispersion liquids of Comparative Examples 1 to 4. The pigment dispersion liquids of Examples 2 to 5 and 7 to 11, each having a cationization rate of the amines in the block copolymer (B) of 10% to 70%, had especially low viscosity and especially high dispersion stability.

In addition, the color layers produced with the photosensitive color resin compositions of Examples 12 to 22, the compositions comprising the pigment dispersion liquids of Examples 1 to 11, respectively, had excellent adhesion and high development property. The developing property of Examples 12, 13, 18 and 22 are slightly lower than other Examples but in the range which is not problematic in practice.

On the other hand, the pigment dispersion liquids of Comparative Examples 2 and 3, the former comprising the low molecular compound (C) added after the dispersion step and the latter obtained through the step of previously reacting the polymer (B) having tertiary or lower amines with the amine-reactive low molecular compound (C), had high viscosity and low dispersion stability.

The pigment dispersion liquids of Comparative Examples 1 and 4, both of which do not comprise the low molecular compound (C), also had high viscosity and problems with dispersion stability, as well.

REFERENCE SIGNS LIST

1. Substrate
2. Light-shielding part
3. Color layer
10. Color filter

The invention claimed is:

1. A method for producing a pigment dispersion liquid, wherein the method comprises the step of dispersing a pigment by mixing at least a pigment (A), a polymer (B) having tertiary or lower amines, an amine-reactive low molecular compound (C), and a dispersion medium (D), and dispersing the pigment (A) while reacting the polymer (B) with the low molecular compound (C);
   wherein a ratio of a total number of amine-reactive functional groups in the low molecular compound (C) to a total number of amines in the polymer (B) is 20 to 70%; and
   wherein the low molecular compound (C) is one or more kinds selected from the group consisting of: monobutyl phosphate, dibutyl phosphate, methyl phosphate, dibenzyl phosphate, diphenyl phosphate, phenylphosphinic acid, phenylphosphonic acid and dimethacryloyloxy-ethyl acid phosphate.

2. The method for producing a pigment dispersion liquid according to claim 1, wherein the polymer (B) is a block copolymer.

3. The method for producing a pigment dispersion liquid according to claim 1, wherein the polymer (B) has an amine value of 10 to 200 mg KOH/g.

4. The method for producing a pigment dispersion liquid according to claim 1, wherein the low molecular compound (C) has a molecular weight of 50 to 400.

* * * * *